(12) United States Patent
Van Hoorn et al.

(10) Patent No.: US 10,443,690 B2
(45) Date of Patent: Oct. 15, 2019

(54) HEAVY-DUTY INDUSTRIAL TRANSMISSION

(71) Applicant: Twin Disc, Inc., Racine, WI (US)

(72) Inventors: Andrew D. Van Hoorn, Franklin, WI (US); Gerald A. Matranga, Union Grove, WI (US)

(73) Assignee: Twin Disc, Inc., Racine, WI (US)

( * ) Notice: Subject to any disclaimer, the term of this patent is extended or adjusted under 35 U.S.C. 154(b) by 83 days.

(21) Appl. No.: 15/410,117

(22) Filed: Jan. 19, 2017

(65) Prior Publication Data

US 2017/0204943 A1    Jul. 20, 2017

Related U.S. Application Data

(60) Provisional application No. 62/280,219, filed on Jan. 19, 2016.

(51) Int. Cl.
*F16H 3/66* (2006.01)

(52) U.S. Cl.
CPC ............ *F16H 3/666* (2013.01); *F16H 3/66* (2013.01); *F16H 2200/0065* (2013.01); *F16H 2200/2012* (2013.01); *F16H 2200/2046* (2013.01)

(58) Field of Classification Search
CPC ............ F16H 3/666; F16H 2200/2012; F16H 2200/2046; F16H 2200/0065; F16H 2200/2028; F16H 3/66
See application file for complete search history.

(56) References Cited

U.S. PATENT DOCUMENTS

| | | | | |
|---|---|---|---|---|
| 2,822,706 A * | 2/1958 | Miller | ............ | F16H 3/66 475/284 |
| 4,004,473 A * | 1/1977 | Pearce | ............ | F16H 3/666 475/276 |
| 4,205,563 A * | 6/1980 | Gorrell | ............ | F16H 3/666 475/276 |
| 4,744,267 A * | 5/1988 | Lepelletier | ............ | F16H 3/663 475/276 |
| 5,924,951 A * | 7/1999 | Winzeler | ............ | F16H 3/66 475/275 |
| 6,634,980 B1 * | 10/2003 | Ziemer | ............ | F16H 3/66 475/275 |
| 6,960,149 B2 | 11/2005 | Ziemer | | |

(Continued)

FOREIGN PATENT DOCUMENTS

JP    2010032019    2/2010
JP    2015025514    2/2015

*Primary Examiner* — Tinh T Dang
(74) *Attorney, Agent, or Firm* — Boyle Fredrickson S.C.

(57) ABSTRACT

A heavy-duty industrial transmission is provided that can be implemented in a frac pump system with planetary gearsets with straightforward shift methodologies, slow back-driven speeds, and no recirculating torque in any of the ranges. The heavy-duty transmission has a high number of ranges and may be configured with no reverse range, no countershaft, no overdrive range(s), small and consistent steps of ratios between ranges, and a deep or large reduction ratio of the lowest range, such as at least about a 5:1 reduction. The heavy-duty industrial transmission may have a four-stage planetary arrangement that is configured to provide nine (9) ranges for the transmission that only requires two double pack shifts, with the remaining shifts being single pack shifts.

13 Claims, 20 Drawing Sheets

(56) References Cited

U.S. PATENT DOCUMENTS

| | | | |
|---|---|---|---|
| 6,976,930 B2* | 12/2005 | Winzeler | F16H 3/66 475/277 |
| 6,991,578 B2 | 1/2006 | Ziemer | |
| 7,018,319 B2 | 3/2006 | Ziemer | |
| 7,901,314 B2 | 3/2011 | Salvaire et al. | |
| 8,083,631 B2* | 12/2011 | Shiohara | F16H 3/666 475/282 |
| RE43,315 E | 4/2012 | Ziemer | |
| 8,197,376 B2 | 6/2012 | Gumpoltsberger et al. | |
| 8,210,981 B2 | 7/2012 | Bauknecht et al. | |
| 8,210,983 B2 | 7/2012 | Gumpoltsberger et al. | |
| 8,231,495 B2 | 7/2012 | Gumpoltsberger et al. | |
| 8,231,496 B2 | 7/2012 | Gumpoltsberger et al. | |
| 8,241,170 B2 | 8/2012 | Gumpoltsberger et al. | |
| 8,246,504 B2 | 8/2012 | Gumpoltsberger et al. | |
| 8,251,859 B2 | 8/2012 | Gumpoltsberger et al. | |
| 8,303,455 B2 | 11/2012 | Gumpoltsberger et al. | |
| 8,382,634 B2 | 2/2013 | Beck et al. | |
| 8,398,522 B2 | 3/2013 | Bauknecht et al. | |
| 8,403,803 B2 | 3/2013 | Gumpoltsberger et al. | |
| 8,414,446 B2* | 4/2013 | Beck | F16H 3/66 475/277 |
| 8,419,587 B2 | 4/2013 | Gumpoltsberger et al. | |
| 8,430,785 B2 | 4/2013 | Beck et al. | |
| 8,444,524 B2 | 5/2013 | Gumpoltsberger et al. | |
| 8,444,525 B2 | 5/2013 | Gumpoltsberger et al. | |
| 8,529,394 B2 | 9/2013 | Gumpoltsberger et al. | |
| 8,657,717 B2 | 2/2014 | Gumpoltsberger et al. | |
| 8,663,056 B2 | 3/2014 | Gumpoltsberger et al. | |
| 8,672,795 B1 | 3/2014 | Maurer et al. | |
| 8,721,492 B2 | 5/2014 | Fellmann et al. | |
| 2010/0257961 A1 | 10/2010 | Rieger et al. | |
| 2010/0257962 A1 | 10/2010 | Recker et al. | |
| 2012/0053004 A1* | 3/2012 | Beck | F16H 3/66 475/275 |
| 2013/0157796 A1 | 6/2013 | Etchason | |
| 2013/0267369 A1 | 10/2013 | Beck et al. | |
| 2015/0011349 A1* | 1/2015 | Downs | B60K 17/35 475/198 |
| 2015/0087470 A1 | 3/2015 | Takagi et al. | |
| 2015/0133259 A1* | 5/2015 | Nakamura | F16H 3/66 475/275 |

\* cited by examiner

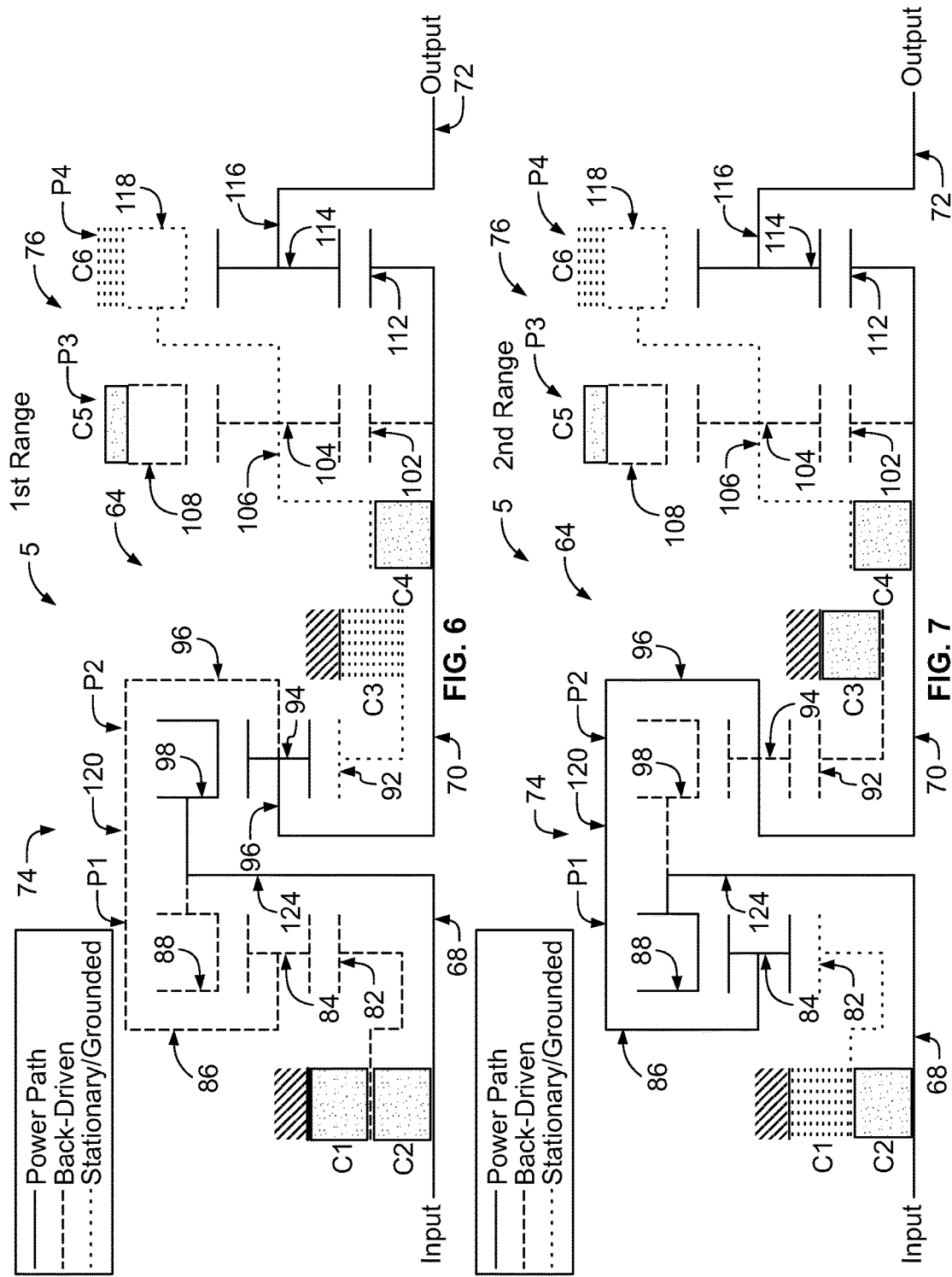

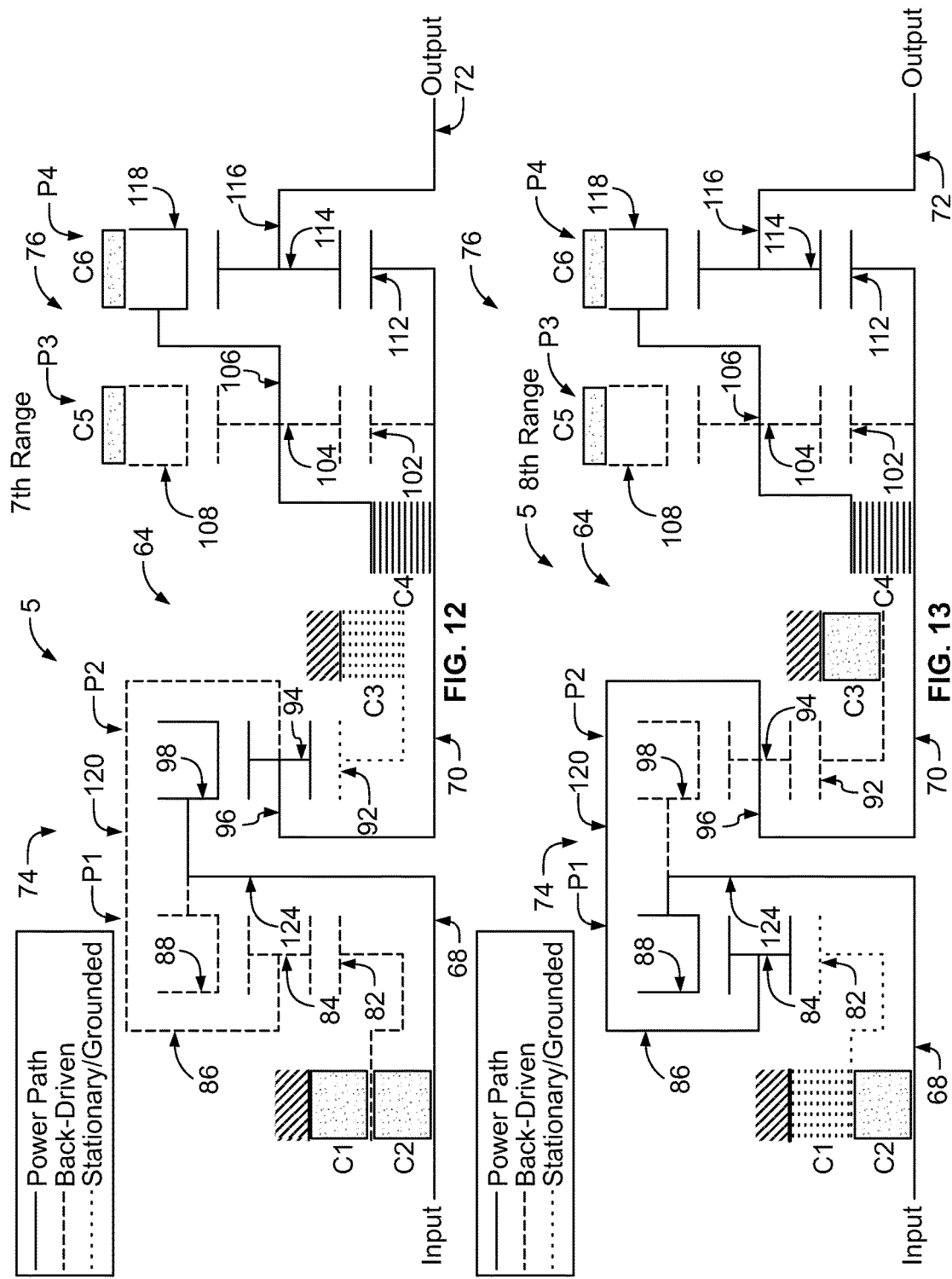

HEAVY-DUTY INDUSTRIAL TRANSMISSION

CROSS REFERENCE TO RELATED APPLICATIONS

This application claims a benefit of priority under 35 USC § 119(e) to U.S. Provisional Patent Application No. 62/280,219 filed Jan. 19, 2016, the entire contents of which are hereby expressly incorporated by reference into the present application.

BACKGROUND OF THE INVENTION

Field of the Invention

The preferred embodiments are directed to industrial transmissions and, more particularly, to a heavy-duty industrial transmission without reversing action or reverse gears and without countershafts. The present transmissions may be used in stationary applications like those within the well drilling and completion segments of the oil and gas industries, such as fracturing (frac) pump systems used for well stimulation by hydraulically fracturing subterranean formations.

Discussion of the Related Art

Hydraulically fracturing subterranean formations is a common way of increasing the porosity of and, thus, flow rate through production zones that feed boreholes of wells that remove underground resources like oil and gas. Increasing the flow rate through the production zones correspondingly increases the productivity of the wells.

Extreme hydraulic pressures are required for fracturing subterranean formations, for example, 10,000 psi or more. To achieve these pressures, frac pump systems include heavy-duty pumps that are powered by high horsepower engines, with heavy-duty transmissions delivering torque from the engines to the respective pumps.

Heavy-duty transmissions used in frac pump systems are typically already existing heavy-duty mechanical transmissions that are designed for other applications. Since these existing heavy-duty transmissions are rated to handle the high horsepower engines that drive the pumps of the frac pump systems, the existing heavy-duty transmissions are repurposed for frac pump system uses.

Commonly, these repurposed heavy-duty transmissions are from off-road or other heavy duty vehicles. Heavy-duty vehicle transmissions tend to be large and heavy with countershafts and other features which add to the overall size of the transmission housings needed to accommodate these internal components. These heavy-duty vehicle transmissions typically have a large number of speeds or ranges, such as six or more ranges, and a large number of ranges can be beneficial in frac pump systems. That is because, although only a few ranges may be used for a particular fracing application, other ranges may be used in other fracing applications, depending on the various pump sizes and well pressures that are needed for those applications. However, the ratios of the heavy-duty vehicle transmissions ranges tend to be spaced at inconsistent steps, whereby the reduction or gear ratio values of adjacent pairs of ranges tend to be different, to provide desired vehicle movement performance requirements. But inconsistent steps between ranges can make some of the ranges or groups of sequential ranges ill-suited for delivering power to high-pressure pumps of frac pump systems. Inconsistent steps can make it difficult to finely adjust pump driving speed through range changes while maintaining optimal engine RPM. Inconsistent steps may also include at least one large change in reduction ratio that the engine may not be able to power while overcoming the head pressure of the well, making the gear change too large for the engine to handle. Typical heavy-duty vehicle transmissions also include ranges that provide reversing action or reverse gears for backward travel and overdrive ranges for high speed travel. However, high-pressure pumps of frac pump systems are typically neither driven in reverse nor driven at speeds that are faster than engine speed or transmission input speed because driving the pumps at high speeds can produce heavy vibration in the equipment.

Other existing heavy-duty transmissions used in frac pump systems include heavy-duty industrial transmissions used in other stationary applications. Although some planetary-type transmissions have been implemented in frac pump systems, many industrial transmissions used in frac pump systems have countershaft configurations and a large number of gears like heavy-duty vehicle transmissions. Heavy-duty industrial transmissions for stationary applications typically have a large number of gears or ranges, though again with ratios of the ranges tending to be spaced at inconsistent steps.

In order to provide the large number of ranges, heavy-duty transmissions typically incorporate planetary gearsets or compound planetary gearsets. The planetary gearsets are controlled to direct power through different components of the planetary gearsets to provide the desired output gear ratios for ranges. Control includes actuating clutches to restrict or allow rotation of the various planetary gearset components, such as sun gears, planet gears, planet carriers, or ring gears to establish different power paths and output rotational speeds of the planetary gearsets.

Control of compound planetary gearsets or multiple planetary gearsets can require actuating multiple clutches during a single shift event, such as a multipack shift. Multipack shifts are typically synchronized and closely coordinated, and these synchronized multipack shifts can be complicated to control.

Controlling compound or multiple planetary gearsets typically cause(s) rotation of components of the planetary gearsets that are loaded and thus in the power path, but, in at least some of the ranges, also causes rotation of some components of the planetary gearsets that are not loaded.

The loaded components of planetary gearsets can experience recirculating torque in at least some ranges with higher values. Although a transmission output torque value will be a multiplication of the transmission input torque value as a function of the reduction ratio for a particular range, internal torque values can be much higher than the output torque value of the transmission. These higher internal torque values can be transmitted through at least some of the loaded planetary gearset components as recirculating torque that is higher than the output torque value(s), depending on, for example, particular gear ratios within the planetary gearsets. High recirculating torque values can affect the use-life of the components experiencing the recirculating torque and therefor require internal components that are designed to handle the high recirculating torque values.

The unloaded but rotating components of planetary gearsets are freely spinning on unloaded bearings at back-driven speeds. Some back-driven speeds can be very high. High back-driven speeds can cause roller bearings to be lightly loaded, which may result in skidding of the rollers in the bearing raceways. Skidding of the roller bearings in this way can result in high speed failures.

Another challenge with the present application is that mounting space is limited within frac pump systems, which are commonly mounted on trailers that are pulled by on-road semi tractors. In order to help repurposed heavy-duty transmissions fit in limited spaces within frac pump systems, the heavy-duty transmissions are often directly or closely coupled.

Overall, a heavy-duty transmission suitable for use in a frac pump system that allows the frac pump system to be brought smoothly online regardless of engine speed and has a relatively small size with robust construction and straightforward operation is desired.

SUMMARY OF THE INVENTION

The preferred embodiments overcome the above-noted drawbacks by providing a heavy-duty industrial transmission that can be implemented in a frac pump system with planetary gearsets with straightforward shift methodologies, slow back-driven speeds, and no recirculating torque in any of the ranges.

In accordance with a first aspect of the invention, the heavy-duty transmission has a high number of ranges with small and consistent steps of ratios between ranges and a deep or large reduction ratio of the lowest range, such as at least about a 5:1 reduction. The transmission has no reverse range, no countershaft, no overdrive range(s), so the transmission itself can be smaller than it would be if it had to accommodate these additional components. This allows the heavy-duty transmission to be compact enough to allow use with a torque converter in a frac pump system application and a deep enough reduction ratio at its lowest range to allow for relatively slow pump speeds and output flow while bringing the frac pump system online to reduce disruption of the well formation.

In accordance with another aspect of the invention, a heavy-duty transmission includes a transmission housing, an input shaft arranged at least partially in the transmission housing receiving power into the heavy-duty transmission, and an output shaft arranged at least partially in the transmission housing delivering power out of the heavy-duty transmission. A center shaft is arranged in the transmission housing between and longitudinally aligned with the input and output shafts. A four-stage planetary arrangement selectively delivers power from the input shaft to the center shaft and from the center shaft to the output shaft.

In accordance with another aspect of the invention, a four-stage planetary arrangement includes a front planetary section with a pair of front planetary gearsets and a back planetary section with a pair of back planetary gearsets. The front planetary section may include a front set of three clutches for establishing three distinct power flow paths through different components of the pair of front planetary gearsets. The back planetary section may include a back set of three clutches for establishing three distinct powerful paths through different components of the pair of back planetary gearsets. The clutches engage various ones of sun gears, planet carriers, and ring gears at the front and back planetary sections to ground and therefore hold stationary corresponding components or lock various components into rotational unison with each other to provide the distinct power paths that correspond to achieve reductions or gear ratios of the ranges of the transmission.

In accordance with another aspect of the invention, the four-stage planetary arrangement is controlled to provide a shift methodology in which range changes are achieved primarily by single pack shifts in the front planetary section, with relatively few double pack shifts in which shifts occur in both the front and back planetary sections. This may include controlling three clutches in the front planetary section to activate or engage only a single one of the three clutches of the front set at any given time to provide three power paths through the front planetary section for three clutch engagement states. Of the three power paths corresponding to the three clutch engagement states in the front planetary section, two may provide reductions through the front planetary gearset and the third may provide lockup or no reduction through the front planetary gearset. The three clutches in the back planetary section may be controlled to activate or engage only a single one of the three clutches of the back set at any given time to provide three power paths through the back planetary section for the three clutch engagement states. Each power path and clutch engagement state in the back planetary section may be held during consecutive power path and clutch engagement state changes in the front planetary section, so that clutch activation and deactivation in the back planetary section occurs less frequently than in the front planetary section. The three power paths corresponding to the three clutch engagement states in the back planetary section may provide two reductions through the back planetary gearset and the third may provide lockup or no reduction through the back planetary gearset.

In accordance with another aspect of the invention, a four-stage planetary arrangement includes a shift methodology in which, starting at the lowest range, the back planetary section is held in a first state with a first back end power path with one of the clutches in the back planetary section remaining engaged during two consecutive shift events in the front planetary section. The two consecutive single pack shift events occur to shift from $1^{st}$ range to $2^{nd}$ range and from $2^{nd}$ range to $3^{rd}$ range, in which only a single clutch in the front planetary section is disengaged and another clutch is engaged. A double pack shift may provide a range change from $3^{rd}$ range to $4^{th}$ range. During the double pack shift, in the back planetary section, the previously engaged clutch is released and another clutch is engaged to shift the back planetary section to a second state with a second back end power path. During the double pack shift to provide the $4^{th}$ range, the front planetary section returns to the first state with the first power path corresponding to that of the $1^{st}$ range. Two more consecutive single pack shift events in the front planetary section are used to shift from $4^{th}$ range to $5^{th}$ range and from $5^{th}$ range to $6^{th}$ range while the back planetary gearset remains in the second state with the second back end power path. Another double pack shift may provide a range change from $6^{th}$ range to $7^{th}$ range. During the double pack shift, in back planetary section, the previously engaged clutch is released and another clutch is engaged to shift the back planetary section to a third state with a third back end power path. During the double pack shift to provide the $7^{th}$ range, the front planetary section again returns to the first state with the first power path corresponding to that of the $1^{st}$ range. Two more consecutive single pack shift events in the front planetary section are used to shift from $7^{th}$ range to $8^{th}$ range and from $8^{th}$ range to $9^{th}$ range while the back planetary gearset remains in the third state with third back end power path.

In accordance with another aspect of the invention, in the front planetary section of the four-stage planetary arrangement, the planetary gearsets may be connected to each other through multiple connections. The ring gears of the planetary gearsets in the front planetary section may be connected to each other and the planet carriers of the planetary gearsets in the front planetary section may also be connected to each other. This may be done with a relatively wide common ring gear having two spaced-apart internally toothed surfaces that define the two ring gears for the pair of planetary gearsets in the front planetary section. A planet carrier assembly can be arranged at least partially radially outward of the ring gears to provide a connection between the planet carriers in the front planetary section. In the back planetary section, the front-most planet carrier may be connected to the back-most ring gear.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 6 is a simplified schematic view showing a $1^{st}$ range power path of the heavy-duty transmission of FIG. 2;

FIG. 7 is a simplified schematic view showing a $2^{nd}$ range power path of the heavy-duty transmission of FIG. 2;

FIG. 12 is a simplified schematic view showing a $7^{th}$ range power path of the heavy-duty transmission of FIG. 2;

FIG. 13 is a simplified schematic view showing an $8^{th}$ range power path of the heavy-duty transmission of FIG. 2;

Figure 1:
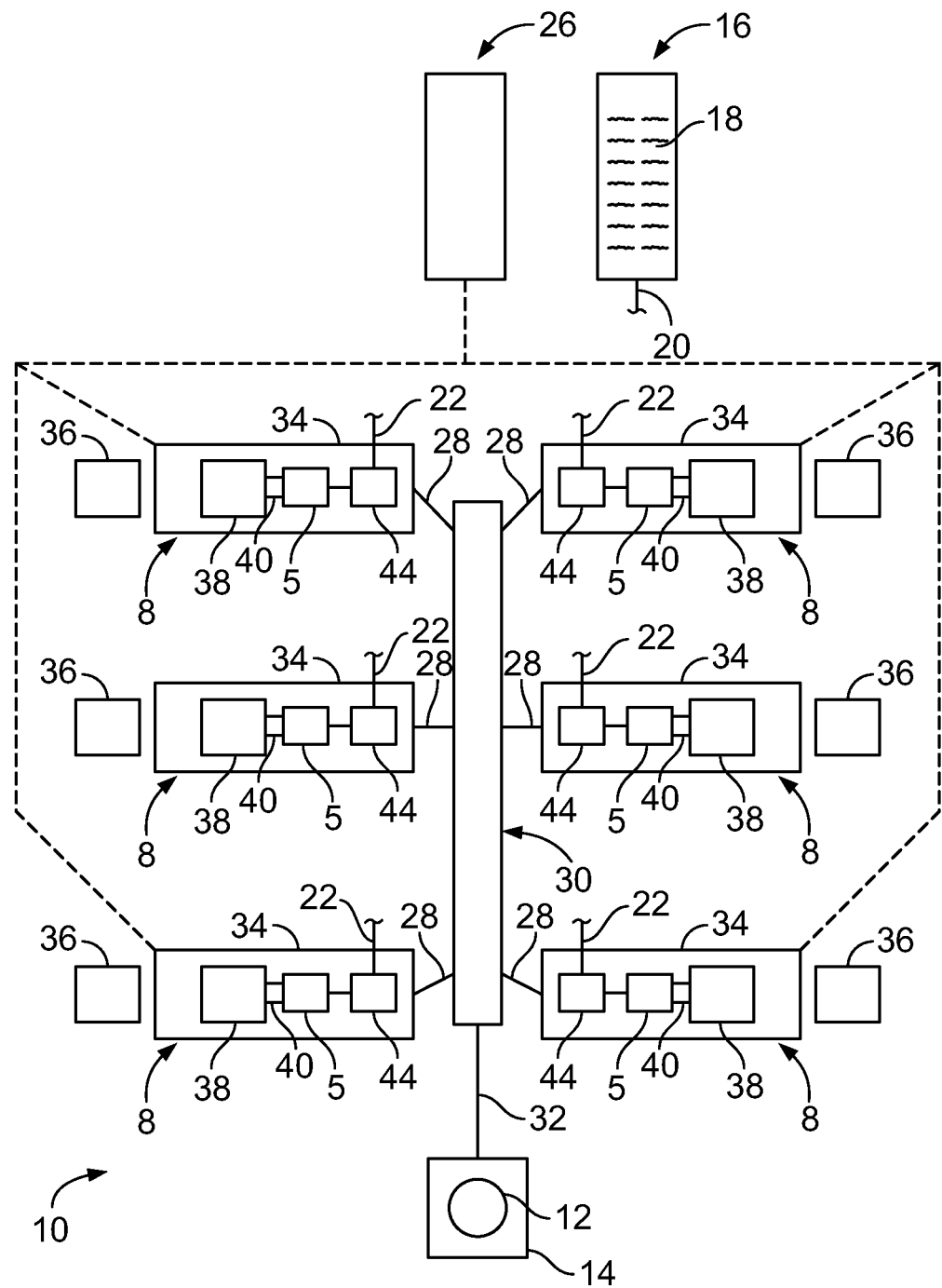
FIG. 1 is a schematic illustration of a heavy-duty transmission used in a frac pump system at a drilling site.

In describing preferred embodiments of the invention, which are illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the words "connected", "attached", "coupled", or terms similar thereto are often used. They are not limited to direct connection but include connection through other elements where such connection is recognized as being equivalent by those skilled in the art.

DETAILED DESCRIPTION OF PREFERRED EMBODIMENTS

Referring to FIG. 1, a heavy-duty industrial transmission 5 is shown implemented at each of multiple fracturing pump ("frac pump") systems 8 at a drilling site 10. Drilling site 10 is schematically shown set up for hydraulic fracturing ("fracking") subterranean formations to stimulate a well with a borehole 12 that extends downwardly from a wellhead 14. A fracturing fluid ("frac fluid") storage system 16 is configured to deliver frac fluid 18 through outlet line 20 into inlet lines 22 of the frac pump systems 8. Frac site control system 26 communicates with and is configured to control each of the frac pump systems 8. Frac site control system 26 includes a computer that executes various stored programs while receiving inputs from and sending commands to the frac pump systems 8 for controlling, for example, activation or selectively bringing the frac pump systems 8 online for fracking the subterranean formations by controlling the various electronic, electromechanical, and hydraulic systems and/or other components of each frac pump system 8. Frac site control system 26 may include the TDEC-500 electronic control system available from Twin Disc®, Inc. for controlling the frac pump systems 8. Frac pump systems 8 that are activated and online deliver frac fluid 18 under high pressure, for example, 10,000 psi or more through frac pump system outlet lines 28 into manifold 30 that delivers the pressurized frac fluid 18 through manifold outlet line 32 and wellhead 14 to flow through borehole 12 into the well for fracturing the subterranean formation.

Still referring to FIG. 1, each frac pump system 8 is shown mounted to a trailer 34 that can be towed by a tractor or tow vehicle, such as semi-tractor 36. To pressurize the frac fluid 18, each frac pump system 8 includes a high horsepower engine shown as engine 38 that can be a diesel or other internal combustion engine capable of outputting at least about 1,000 hp, for example, about 2,500 hp or more. Torque converter 40 connects engine 38 to a heavy-duty transmission shown as transmission 5 that is rated to handle the power from the engine 38. Transmission 5 is connected to drive a heavy-duty frac pump, shown as pump 44, that is capable of highly pressurizing frac fluid 18, for example, to a pressure of at least about 10,000 psi.

Figure 2:
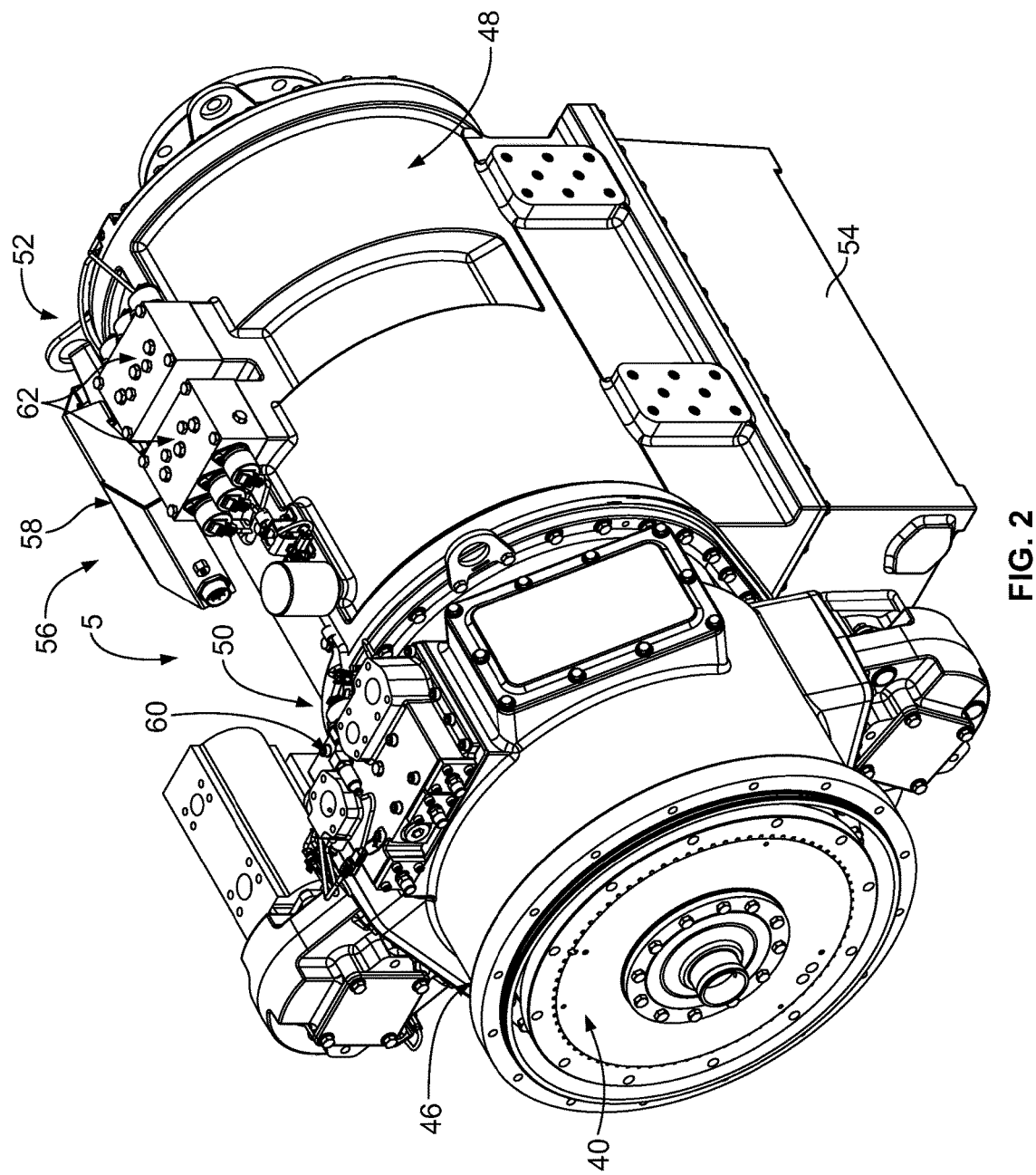
FIG. 2 is a pictorial view from above and in front of a heavy-duty transmission of FIG. 1.
Figure 3:
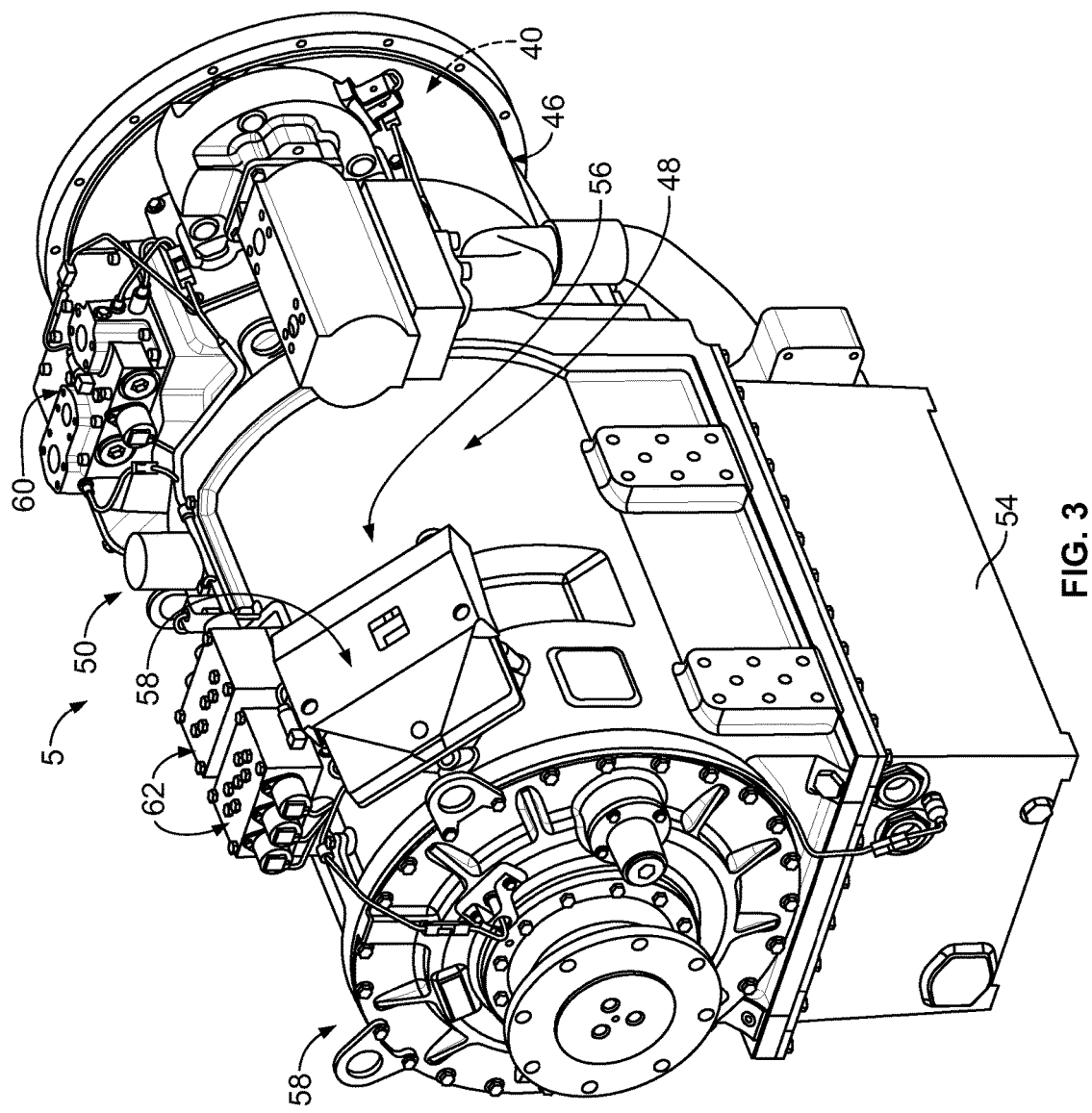
FIG. 3 is a pictorial view from above and behind the heavy-duty transmission of FIG. 2.

Referring now to FIGS. 2 and 3, torque converter 40 is housed in converter housing 46 that is connected to transmission housing 48 at an input end 50 of transmission housing 48 that is opposite an output end 52. A sump 54 is connected to and extends from a bottom portion of transmission housing 48 and holds oil used for lubrication and hydraulic component actuation for torque converter 40 and transmission 5. Transmission control system 56 controls the component actuation for torque converter 40 and transmission 5. Transmission control system 56 includes transmission controller 58 that cooperatively communicates with and is controlled by frac site control system 26. Transmission controller 58 includes a computer that executes various stored programs while receiving inputs from and sending commands to various components, such as torque converter solenoid packs 60 and transmission solenoid packs 62, to control oil flow and engage/disengage various clutches to activate a lockup clutch of torque converter 40 and also to select distinct power paths through and change ranges of transmission 5, as explained in greater detail elsewhere herein.

Figure 4:
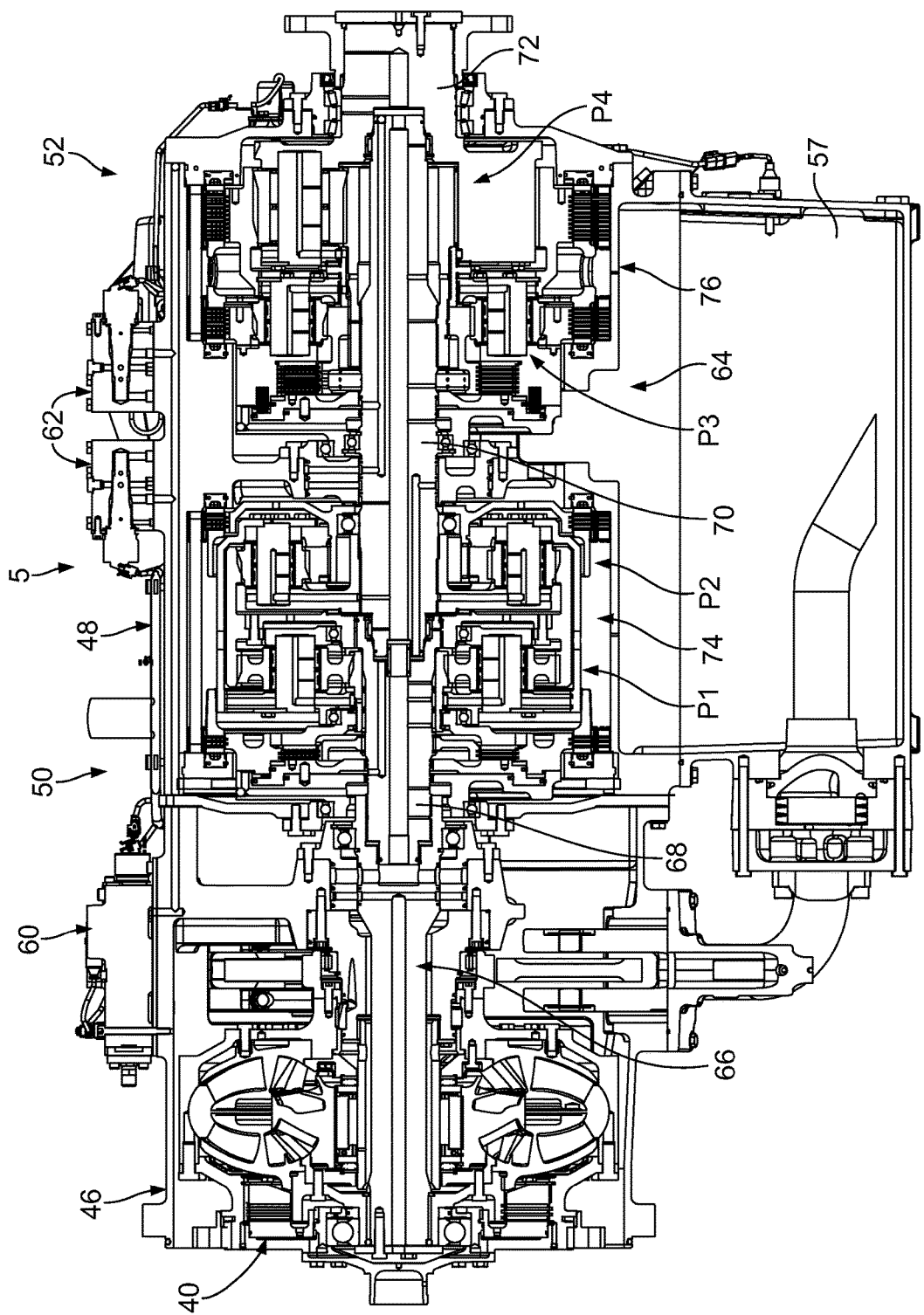
FIG. 4 is a cross-sectional view of the heavy-duty transmission of FIG. 2.

Referring now to FIG. 4, transmission 5 is configured with a four-stage planetary arrangement 64 that provides nine ranges without reversing action or reverse gear(s) so the output shaft 72 may be arranged to rotate in only a single direction and without (a) countershaft(s). The ranges provide deep reduction ratios at the low range(s) and consistent steps between ranges. The below Table 1 shows an exemplary set of nine ranges of transmission 5, showing the reduction ratio for each of the ranges. Of the nine ranges represented in Table 1, $2^{nd}$ range through $9^{th}$ range each has a ratio step of about an 80% reduction of its preceding range reduction ratio, with each shift or range change to a higher range providing a subsequent reduction ratio of between about 77% and about 83% of that of its preceding range until obtaining a direct drive ratio or reduction ratio of 1.00 in $9^{th}$ range.

TABLE 1

| Range | Reduction Ratio |
|---|---|
| 1 | 5.776 |
| 2 | 4.763 |
| 3 | 3.673 |
| 4 | 3.033 |
| 5 | 2.501 |
| 6 | 1.929 |
| 7 | 1.572 |
| 8 | 1.297 |
| 9 | 1.000 |

Still referring to FIG. 4, four-stage planetary arrangement 64 is concentrically arranged outwardly of multiple longitudinally aligned shafts of transmission 5 that receive power from torque converter output shaft 66. The multiple longitudinally aligned shafts of transmission 5 include transmission input shaft 68, transmission center shaft 70, and transmission output shaft 72. The transmission input, center, and output shafts 68, 70, 72 are coupled to each other through the four-stage planetary arrangement 64 to establish the reduction ratios in the different ranges between the rotational speeds of the transmission input and output shafts 68, 72.

Still referring to FIG. 4, four-stage planetary arrangement 64 includes front planetary section 74 at the input end 50 and back planetary section 76 at the output end 52 within transmission housing 48. Front planetary section 74 includes a pair of front planetary gearsets, shown as planetary gearsets P1, P2, that are configured to selectively deliver power along different power paths from input shaft 68 to center shaft 70. Back planetary section 76 includes a pair of back planetary gearsets, shown as planetary gearsets P3, P4, that are configured to selectively deliver power along different power paths from center shaft 70 to output shaft 72.

Figure 5:
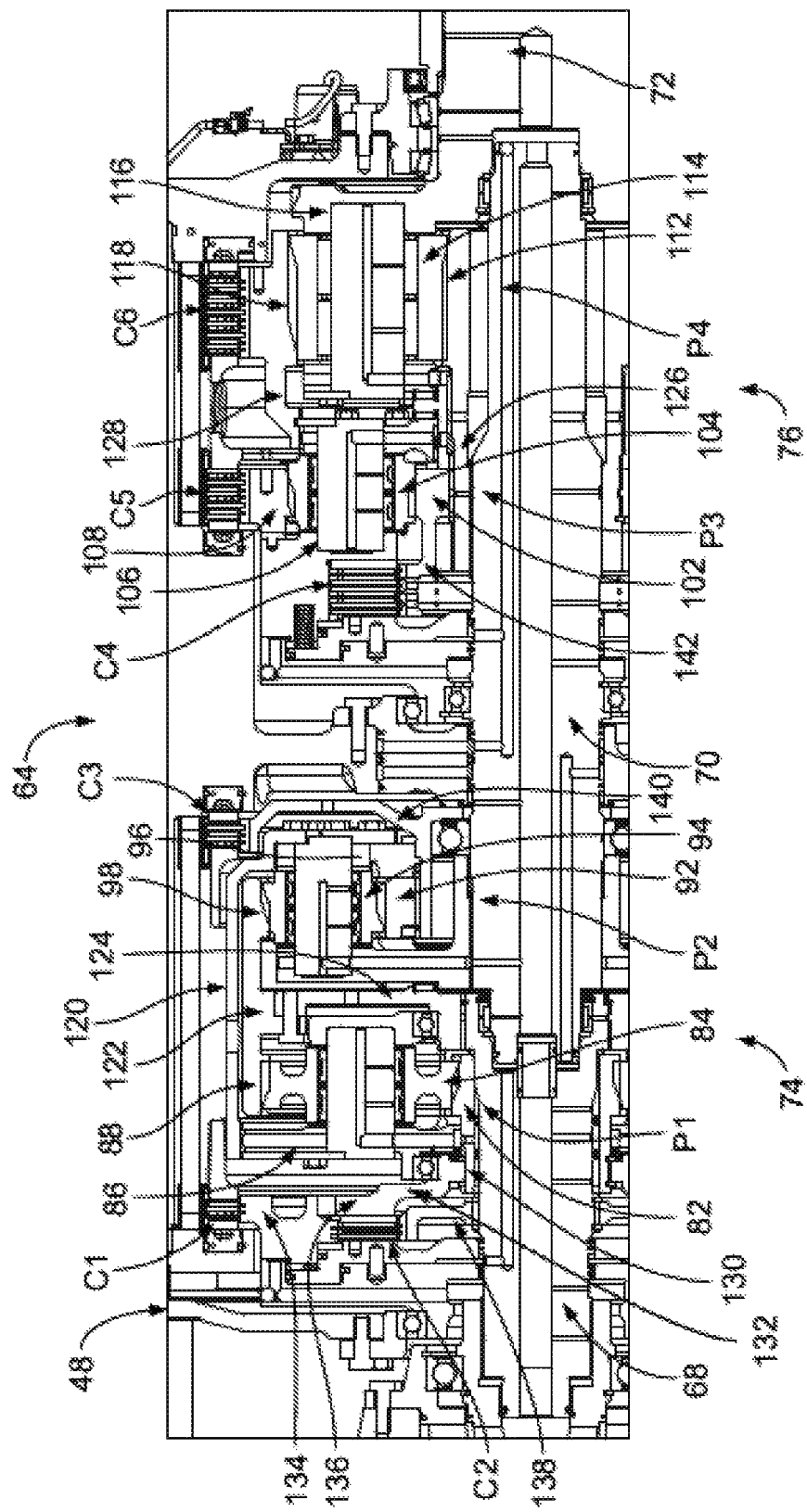
FIG. 5 is an enlarged cross-sectional view of a portion of the heavy-duty transmission of FIG. 2.

Referring now to FIG. 5, planetary gearset P1 includes sun gear 82 with external teeth that mesh with external teeth of planet gears 84 that are supported by planet carrier 86. The teeth of planet gears 84 of a first set of planet gears also mesh with internal teeth of ring gear 88 of the planetary gearset P1. Planetary gearset P2 includes sun gear 92 with external teeth that mesh with external teeth of planet gears 94 that are supported by planet carrier 96. The teeth of planet gears 94 of a second set of planet gears also mesh with internal teeth of ring gear 98 of the planetary gearset P2. Planetary gearset P3 includes sun gear 102 with external teeth that mesh with external teeth of planet gears 104 of a third set of planet gears that are supported by planet carrier 106. The teeth of planet gears 104 also mesh with internal teeth of ring gear 108 of the planetary gearset P3. Planetary gearset P4 includes sun gear 112 with external teeth that mesh with external teeth of planet gears 114 of a fourth set of planet gears that are supported by planet carrier 116. The teeth of planet gears 114 also mesh with internal teeth of ring gear 118 of the planetary gearset P4.

Still referring to FIG. 5, at the front planetary section 74, the planet carriers 86, 96 of planetary gearsets P1, P2 are connected to each other through carrier adapter drum 120 to always rotate at the same speed, defining a common planet carrier assembly in the front planetary section 74. Ring gears 88, 98 of planetary gearsets P1, P2 are arranged in a space that is surrounded by an enclosure defined by the carrier adapter drum 120. Ring gears 88, 98 of planetary gearsets P1, P2 are connected to each other through ring gear collar 122 to always rotate in unison and thus at the same speed, defining a common ring gear in the front planetary section 74. Ring gear adapter flange 124 is internally splined to external splines of input shaft 68 and connected to ring gear collar 122 so that ring gears 88, 98 of planetary gearsets P1, P2 always rotate with input shaft 68, either as transmitting power or as back-driven.

Still referring to FIG. 5, at the back planetary section 76, sun gear 112 of planetary gearset P4 includes sun gear collar 126 that is internally splined to center shaft 70. Sun gear 102 of planetary gearset P3 is internally splined to external splines of collar 126 so that sun gears 102, 112 of planetary gearsets P3, P4 always rotate with center shaft 70, either as transmitting power or as back-driven. Planet carrier 106 of planetary gearset P3 is connected to ring gear 118 of planetary gearset P4 through carrier/ring adapter collar 128 to always rotate at the same speed. Ring gears 108 and 118 of planetary gearsets P3 and P4 are separate from and axially aligned with each other and can rotate at different speeds.

Still referring to FIG. 5, four-stage planetary arrangement 64 has various clutches that are controlled by transmission control system 56 (FIGS. 2 and 3) to provide the nine ranges of transmission 5, such as by controlling oil flow to engage/disengage the clutches to select distinct power paths through the planetary gearsets P1, P2 of front planetary section 74 and through the planetary gearsets P3, P4 of back planetary section 76. At the front planetary section 74, three clutches are shown as clutches C1, C2, C3 as a front set of clutches. At the back planetary section 76, three clutches are shown as clutches C4, C5, C6 as a back set of clutches. The clutches C1, C2, C3, C4, C5, C6 may be balancing clutches or stationary clutches and are all shown as piston-actuated multi-disc clutches that have interleaved clutch discs and friction discs with respective internal and external teeth or tangs that engage corresponding components to engage and selectively lock components with respect to other components or disengage and allow free rotation between the corresponding components.

Still referring to FIG. 5, at the front planetary section 74, clutch C1 is configured to selectively ground the sun gear 82 of planetary gearset P1. Sun gear 82 of planetary gearset P1 includes a collar 130 that is externally splined to internal splines of a clutch backplate 132. Clutch backplate 132 has an upper outer end 134 connected to clutch C1 so that engaging clutch C1 grounds sun gear 82 by stopping rotation of clutch backplate 132 and sun gear 82 with respect to the transmission housing 48. Clutch C2 is configured to selectively lock the sun gear 82 of planetary gearset P1 to input shaft 68. Clutch backplate 132 has an intermediate segment 136 connected to clutch C2 so that engaging clutch C2 locks sun gear 82 into rotational unison with input shaft 68 through input shaft lock collar 138 that is internally splined to external splines of input shaft 68 and is connected to clutch C2. Engaging clutch C2 to lock sun gear 82 into rotational unison with input shaft 68 locks up the front planetary section 74 so all of the components in the planetary gearsets P1, P2 rotate as a unit with the planet gears 84, 94 traveling with their carriers 86, 86, without rotating about their own axes. This provides a 1:1 gear ratio with no reduction through the front planetary section 74 when clutch C2 is engaged. Clutch C3 is configured to selectively ground the sun gear 92 of planetary gearset P2. Sun gear 92 of planetary gearset P2 is internally splined to external splines of an inner segment of ground flange 140. Engaging clutch C3 grounds sun gear 92 by stopping rotation of ground flange 140 and the sun gear 92 with respect to the transmission housing 48.

Still referring to FIG. 5, at the back planetary section 76, clutch C4 is configured to selectively lock carrier 106 of planetary gearset P3 into rotational unison with center shaft 70. This is done through sun gear collar 142 that extends from sun gear 102 of planetary gearset P3 and is connected to clutch C4 that is also connected to carrier 106 of the planetary gearset P3. Engaging clutch C4 to lock the carrier 106 to rotate with center shaft 70 through sun gear 102 of planetary gearset P3 and sun gear collar 126 of planetary gearset P4 causes all of the components in the planetary gearsets P3, P4 to rotate as a unit with the planet gears 104, 114 traveling with their carriers 106, 116 without rotating about their own axes. This locks up the back planetary section 76 when clutch C4 is engaged and provides a 1:1 gear ratio with no reduction through the back planetary section 76. Clutch C5 is configured to selectively ground the ring gear 108 of planetary gearset P3. An outer surface of ring gear 108 is connected to clutch C5 so that engaging clutch C5 grounds ring gear 108 by stopping rotation of ring gear 108 with respect to transmission housing 48. Clutch C6 is configured to selectively ground the ring gear 118 of planetary gearset P4 and the planet carrier 106 of planetary gearset P4. An outer surface of ring gear 118 is connected to clutch C6 so that engaging clutch C6 grounds ring gear 118 and carrier 106 by stopping rotation of ring gear 118 with respect to transmission housing 48 and also stopping rotation of carrier 106 that is connected to ring gear 118 by carrier/ring adapter collar 128.

To select each of the nine ranges of transmission 5, transmission control system 56 controls the four-stage planetary arrangement 64 to engage a single one of the clutches C1, C2, C3 of the front planetary section 74 and a single one of the clutches C4, C5, C6 of the back planetary section 76. Transmission control system 56 performs a shift methodology that primarily uses single pack shift events to minimize multipack shift events. During each single pack shift event, transmission control system 56 changes engagement status or state of one of the clutches C1, C2, C3, C4, C5, C6 to disengage one previously engaged clutch C1, C2, C3, C4, C5, C6 and engage one newly engaged clutch C1, C2, C3, C4, C5, C6.

Referring generally now to FIGS. 6-23, power paths are shown through the transmission 5 for the different ranges that provide the reduction ratios in the above Table 1, which are established by the selective engagement and disengagements of the various clutches C1, C2, C3, C4, C5, C6 of the four-stage planetary arrangement 64. As explained in greater detail elsewhere herein, more than half of the shift events to change ranges are done by way of single pack shift events, shown here as six single pack shift events that are used in the shifting methodology of transmission 5. The single pack shift events correspond to changing from $1^{st}$ range to $2^{nd}$ range, from $2^{nd}$ range to $3^{rd}$ range, from $4^{th}$ range to $5^{th}$ range, from $5^{th}$ range to $6^{th}$ range, from $7^{th}$ range to $8^{th}$ range, and from $8^{th}$ range to $9^{th}$ range. Two multipack shift events are used in the shifting methodology of transmission 5. The multipack shift events correspond to changing from $3^{rd}$ range to $4^{th}$ range and from $6^{th}$ range to $7^{th}$ range.

Still referring generally to FIGS. 6-23, simplified schematic representations or stick diagrams of the power paths are shown in FIGS. 6-14. In FIGS. 6-14, the power path, defined by the path along which torque is transmitted through the respective components of the four-stage planetary arrangement 64 to translate rotation of transmission input shaft 68 into rotation of transmission output shaft 72, is shown with solid black lines. Back-driven components that rotate but did not transmit torque are shown with long-dashed lines. Grounded components that are held stationary are shown with short-dashed lines. In FIGS. 15-23, the power path is shown by the components that are loosely-stippled. Grounded components that are held stationary are shown tightly-stippled.

Figure 15:
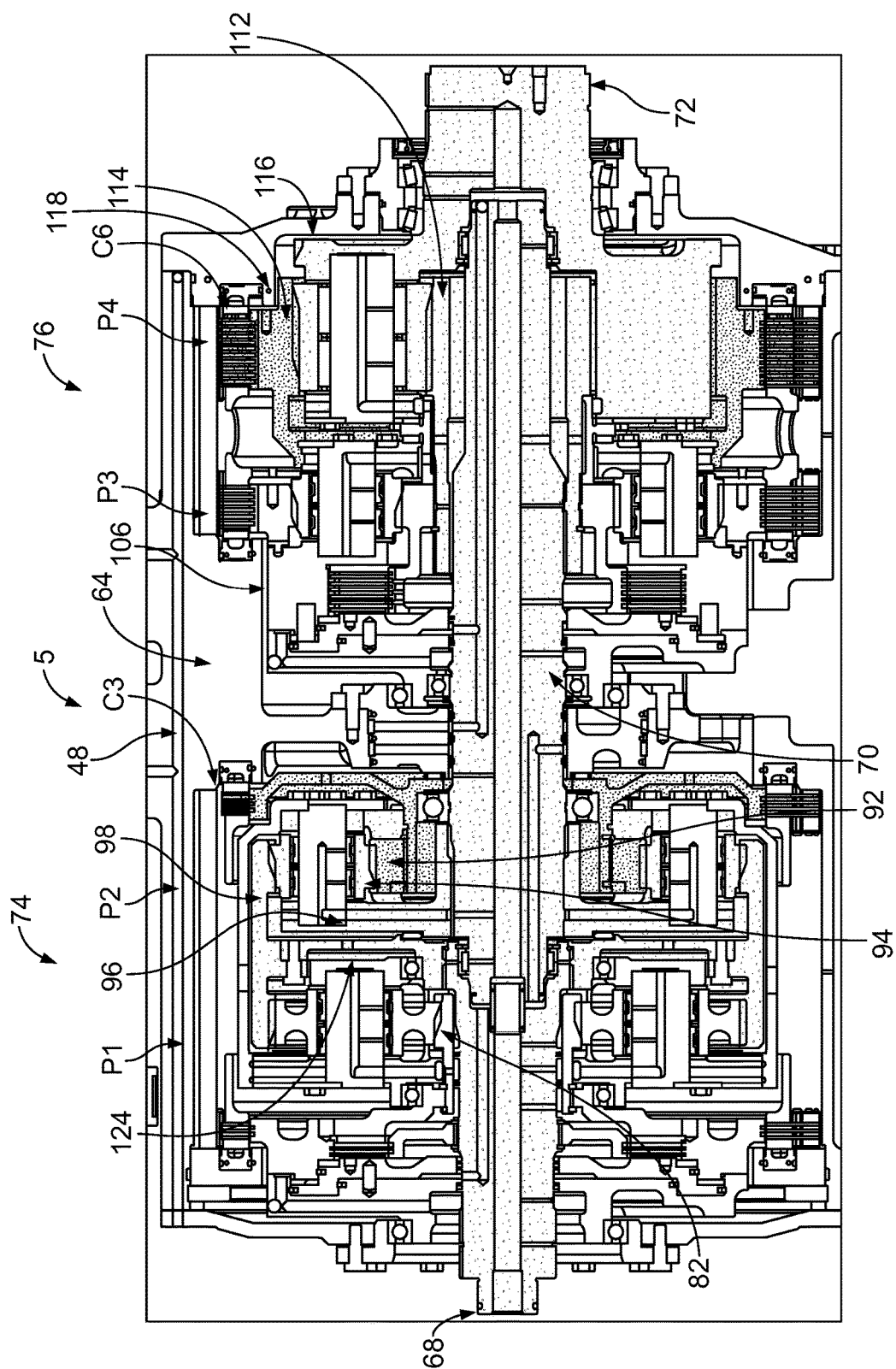
FIG. 15 is a cross-sectional view showing a $1^{st}$ range power path of the heavy-duty transmission of FIG. 2.

FIGS. 6 and 15 show the power path through transmission 5 in $1^{st}$ range. In 1st range, in the front planetary section 74, clutch C3 is engaged, which grounds sun gear 92 of planetary gearset P2. Power flows from input shaft 68 through ring gear adapter flange 124 and ring gear 98 of planetary gearset P2 that rotates the planet gears 94 to drive the carriers 86, 96 into rotation, which delivers power out of the carrier 96 to rotate and deliver power to center shaft 70. As shown in FIG. 6, sun gear 82, planet gears 84, planet carrier 86, ring gear 88, and the portion of carrier 96 upstream of planets 94 are back-driven to rotate without seeing power or transferring driving torque of transmission 5. Referring again to FIGS. 6 and 15, power enters the back planetary section 76 through center shaft 70. In the back planetary section 76, clutch C5 remains disengaged and sun gear 102, planet gears 104, and ring gear 108 are back-driven to rotate without seeing power or transferring driving torque of transmission 5. Clutch C6 is engaged, which grounds ring gear 118 of planetary gearset P4 and planet carrier 106 of planetary gearset P3. Power flows from the center shaft 70 through sun gear 112 on planetary gearset P4 that rotates the planet gears 114 to drive the carrier 116 into rotation, which delivers power out of the carrier 116 to rotate and deliver power to output shaft 72.

Figure 16:
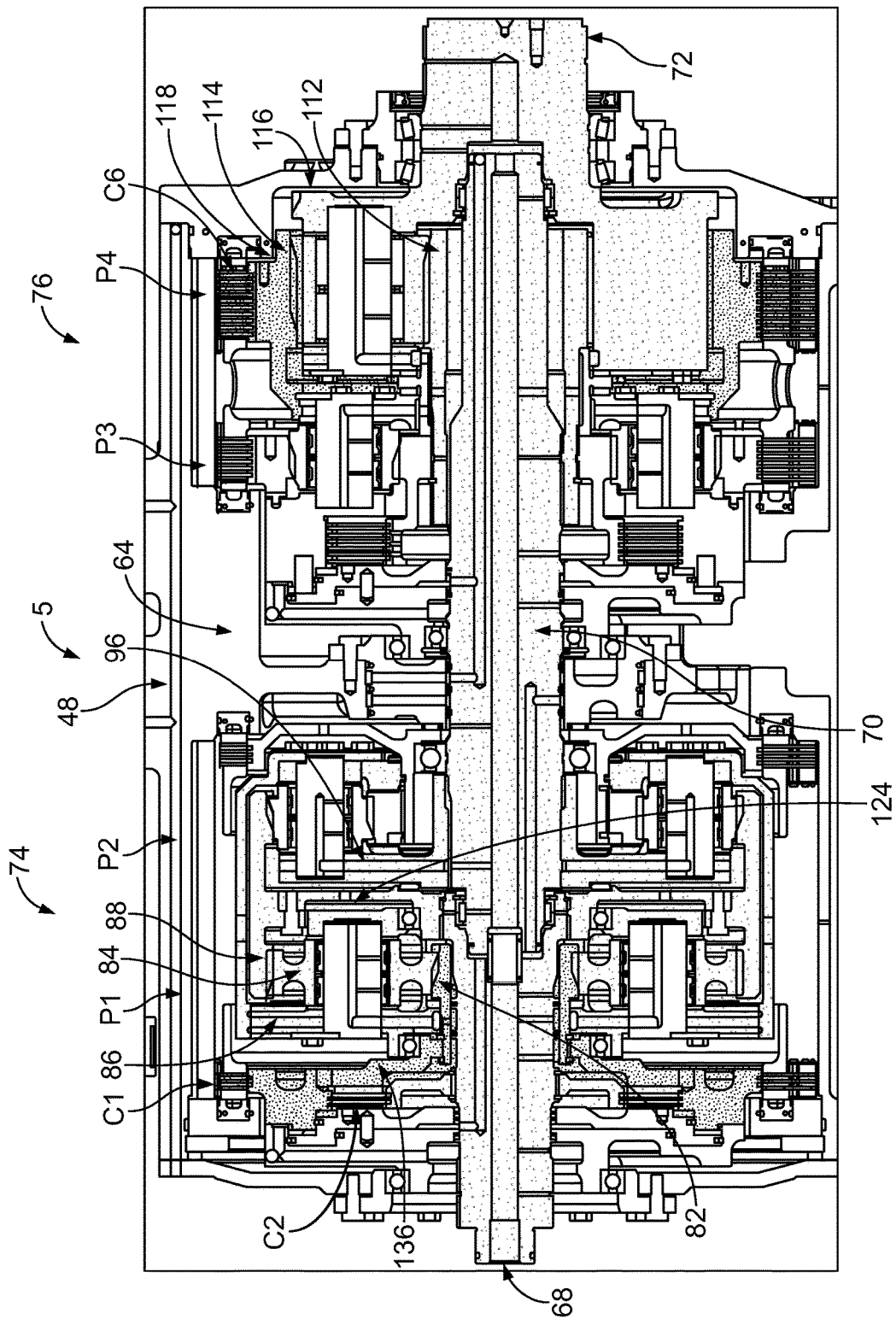
FIG. 16 is a cross-sectional view showing a $2^{nd}$ range power path of the heavy-duty transmission of FIG. 2.

FIGS. 7 and 16 show the power path through transmission 5 in $2^{nd}$ range, following a single pack shift event that shifts transmission 5 from $1^{st}$ range to $2^{nd}$ range. In $2^{nd}$ range, in the front planetary section 74, clutch C1 is engaged, which grounds sun gear 82 of planetary gearset P1. Power flows from input shaft 68 through ring gear adapter flange 124 and ring gear 88 of planetary gearset P1 that rotates the planet gears 84 to drive the carriers 86 and 96 into rotation, which delivers power out of the carrier 96 to rotate and deliver power to center shaft 70. As shown in FIG. 7, sun gear 92, planet gears 94, and ring gear 98 planetary gearset P2 are back-driven to rotate without seeing power or transferring driving torque of transmission 5. Referring again to FIGS. 7 and 16, in the back planetary section 76, clutch C6 remains engaged and power flows through the back planetary section 76 along the same power flow path as when the transmission 5 is in $1^{st}$ range as described above with respect to FIGS. 6 and 15.

Figures 8, 9:
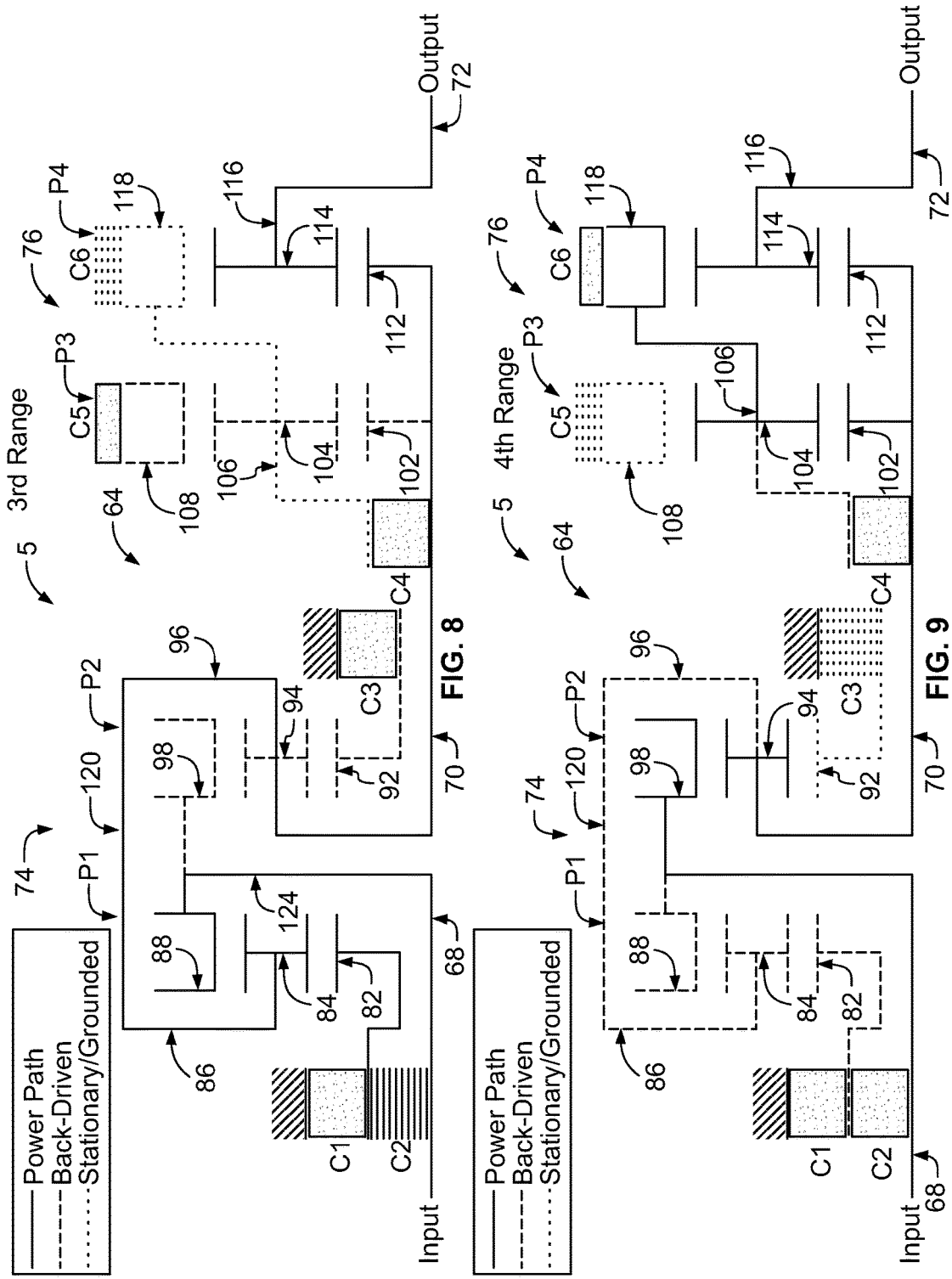
FIG. 8 is a simplified schematic view showing a $3^{rd}$ range power path of the heavy-duty transmission of FIG. 2.
FIG. 9 is a simplified schematic view showing a $4^{th}$ range power path of the heavy-duty transmission of FIG. 2.
Figure 17:
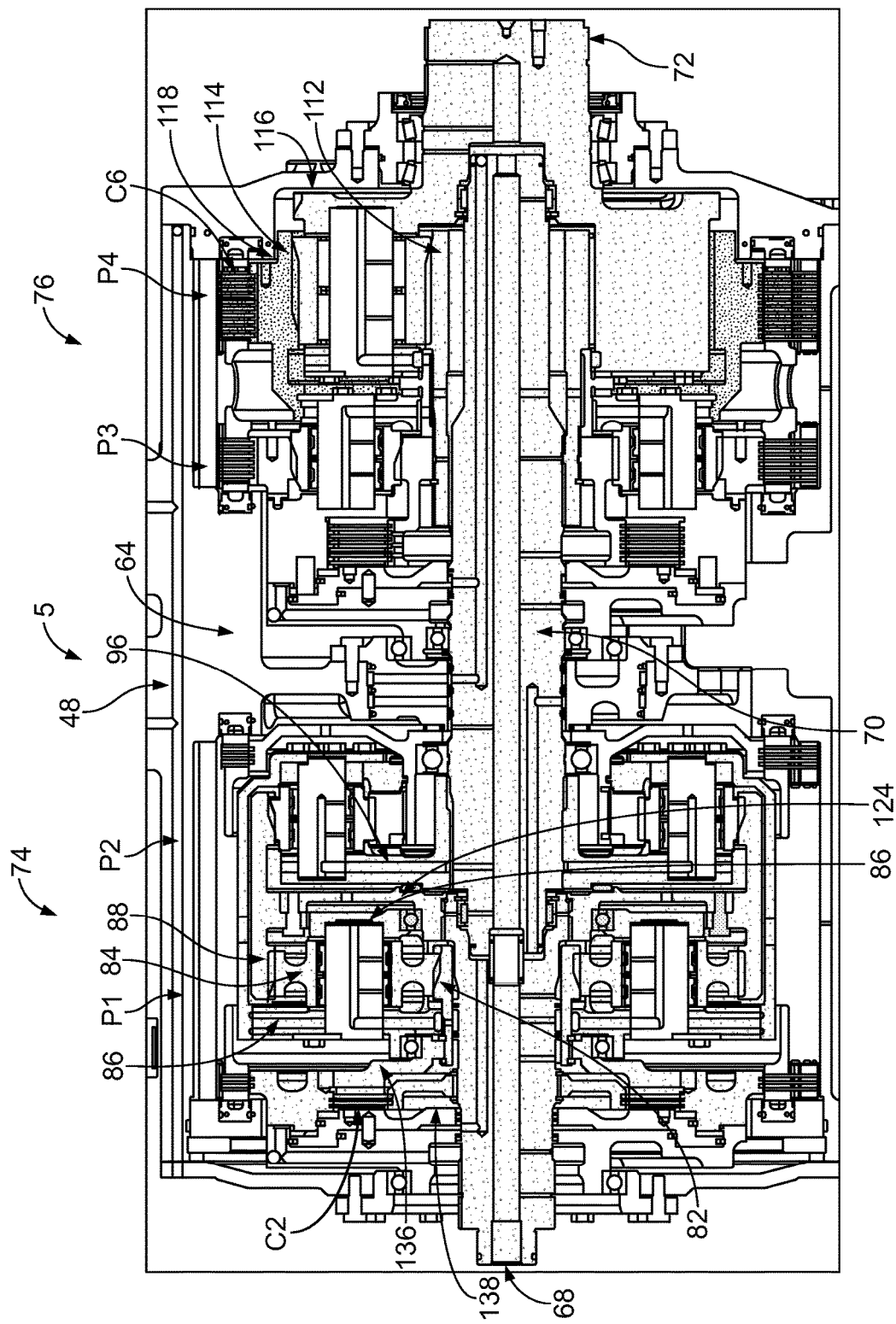
FIG. 17 is a cross-sectional view showing a $3^{rd}$ range power path of the heavy-duty transmission of FIG. 2.

FIGS. 8 and 17 show the power path through transmission 5 in $3^{rd}$ range, following a single pack shift event that shifts transmission 5 from $2^{nd}$ range to $3^{rd}$ range. In $3^{rd}$ range, in the front planetary section 74, clutch C2 is engaged, which locks sun gear 82 of planetary gearset P1 to rotate in unison with input shaft 68. This locks up the front planetary section 74 so all of the components of planetary gearsets P1, P2 rotate as a unit, with the planet gears 84, 94 not rotating about their own axes. Power flows from input shaft 68 through sun gear 82 and ring gear adapter flange 124, through the carriers 86, 96, and out carrier 96 to center shaft 70 without a reduction and thus a 1:1 gear ratio at the front planetary section 74, which rotates center shaft 70 the same speed as input shaft 68. As shown in FIG. 8, sun gear 92, planet gears 94, and ring gear 98 planetary gearset P2 are back-driven to rotate without seeing power or transferring driving torque of transmission 5. Referring again to FIGS. 8 and 17, in the back planetary section 76, clutch C6 remains engaged and power flows through the back planetary section 76 along the same powerful path as when the transmission 5 is in $1^{st}$ range as described above with respect to FIGS. 6 and 15.

Figure 18:
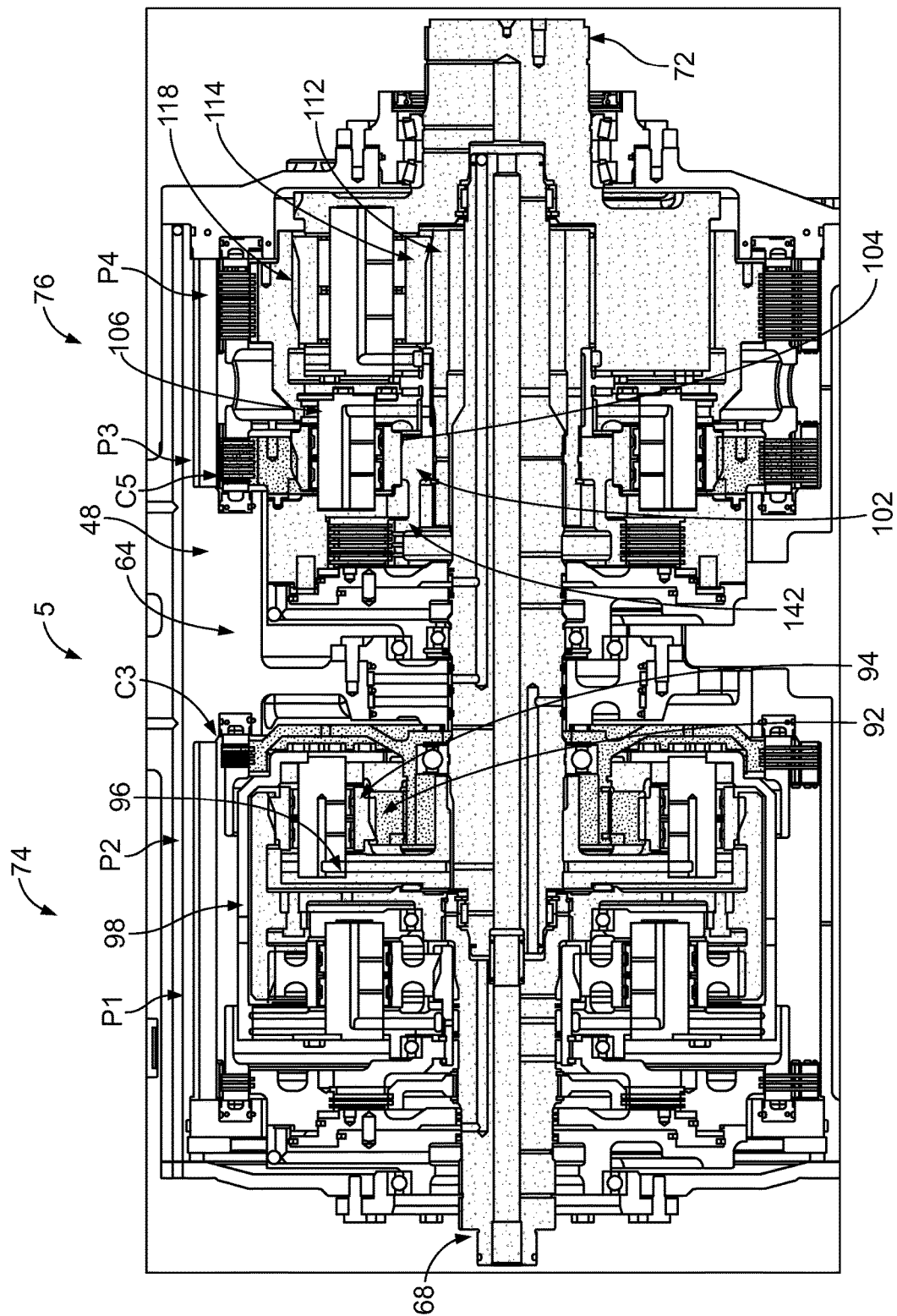
FIG. 18 is a cross-sectional view showing a $4^{th}$ range power path of the heavy-duty transmission of FIG. 2.

FIGS. 9 and 18 show the power path through transmission 5 in $4^{th}$ range, following a double pack shift as a multipack shift event that shifts transmission 5 from $3^{rd}$ range to $4^{th}$ range. In $4^{th}$ range, in the front planetary section 74, clutch C3 is again engaged, and power flows through the front planetary section 74 along the same powerful path as when the transmission 5 is in $1^{st}$ range as described above with respect to FIGS. 6 and 15. In the back planetary section 76, clutch C5 is engaged, which grounds ring gear 108 of planetary gearset P3. Power flows from the center shaft 70 through sun gears 102, 112 of planetary gearsets P3, P4 that rotates the planet gears 104, 114 to drive the carrier 106 and ring gear 118 into rotation, which delivers power out of the carrier 116 to rotate and deliver power to output shaft 72.

Figure 10:
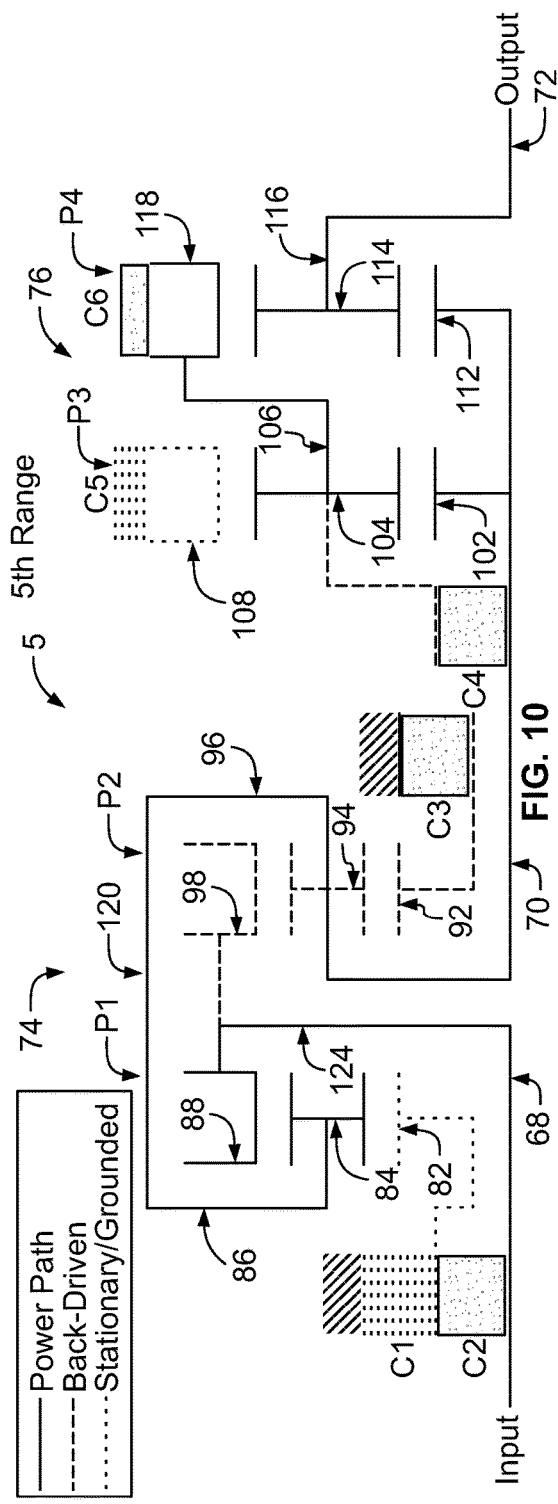
FIG. 10 is a simplified schematic view showing a $5^{th}$ range power path of the heavy-duty transmission of FIG. 2.
Figure 19:
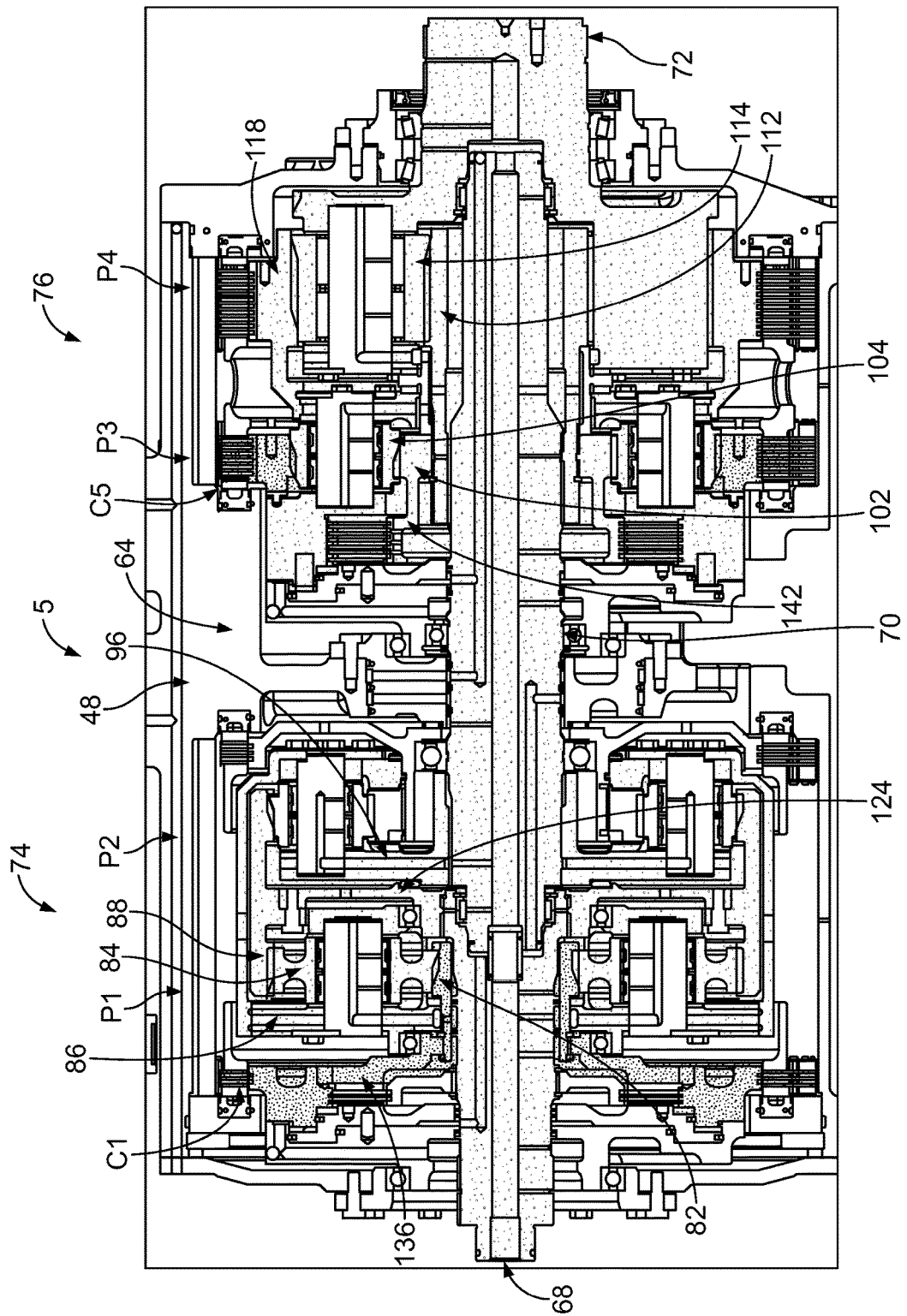
FIG. 19 is a cross-sectional view showing a $5^{th}$ range power path of the heavy-duty transmission of FIG. 2.

FIGS. 10 and 19 show the power path through transmission 5 in $5^{th}$ range, following a single pack shift event that shifts transmission 5 from $4^{th}$ range to 5th range. In $5^{th}$ range, in the front planetary section 74, clutch C1 is again engaged, and power flows through the front planetary section 74 along the same powerful path as when the transmission 5 is in $2^{nd}$ range as described above with respect to FIGS. 7 and 16. In the back planetary section 76, clutch C5 remains engaged, and power flows through the back planetary section 76 along the same powerful path as when the transmission 5 is in $4^{th}$ range as described above with respect to FIGS. 9 and 18.

Figure 11:
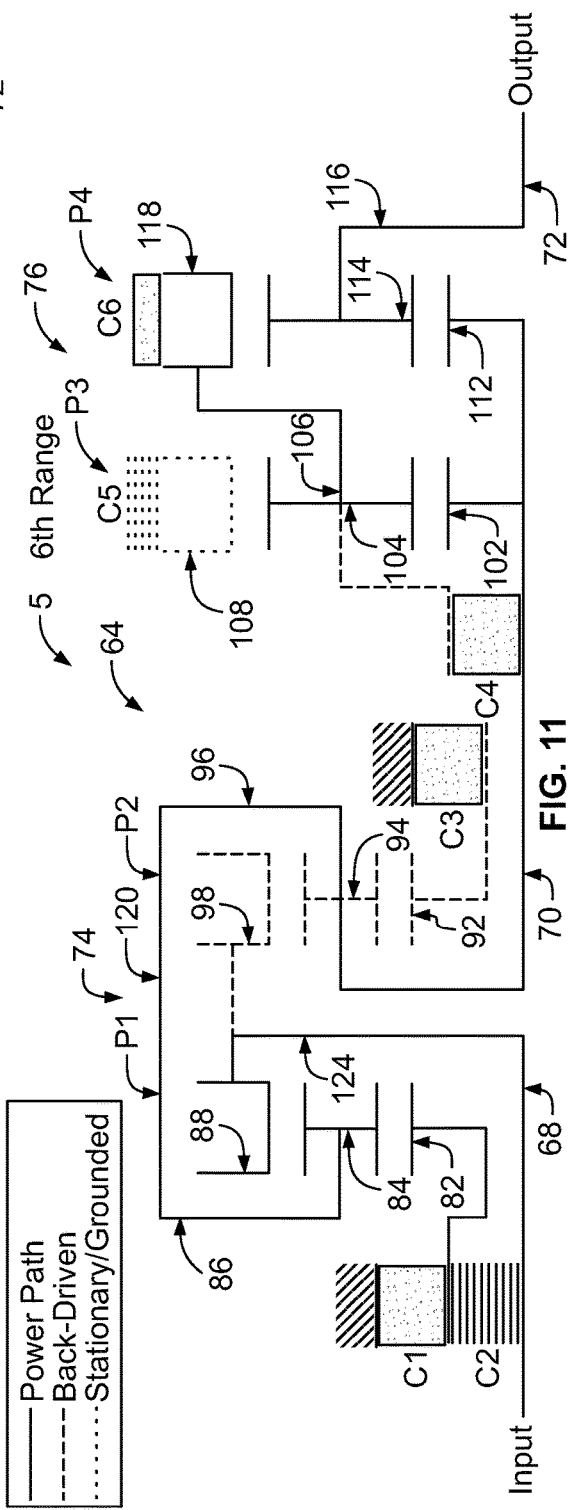
FIG. 11 is a simplified schematic view showing a $6^{th}$ range power path of the heavy-duty transmission of FIG. 2.
Figure 20:
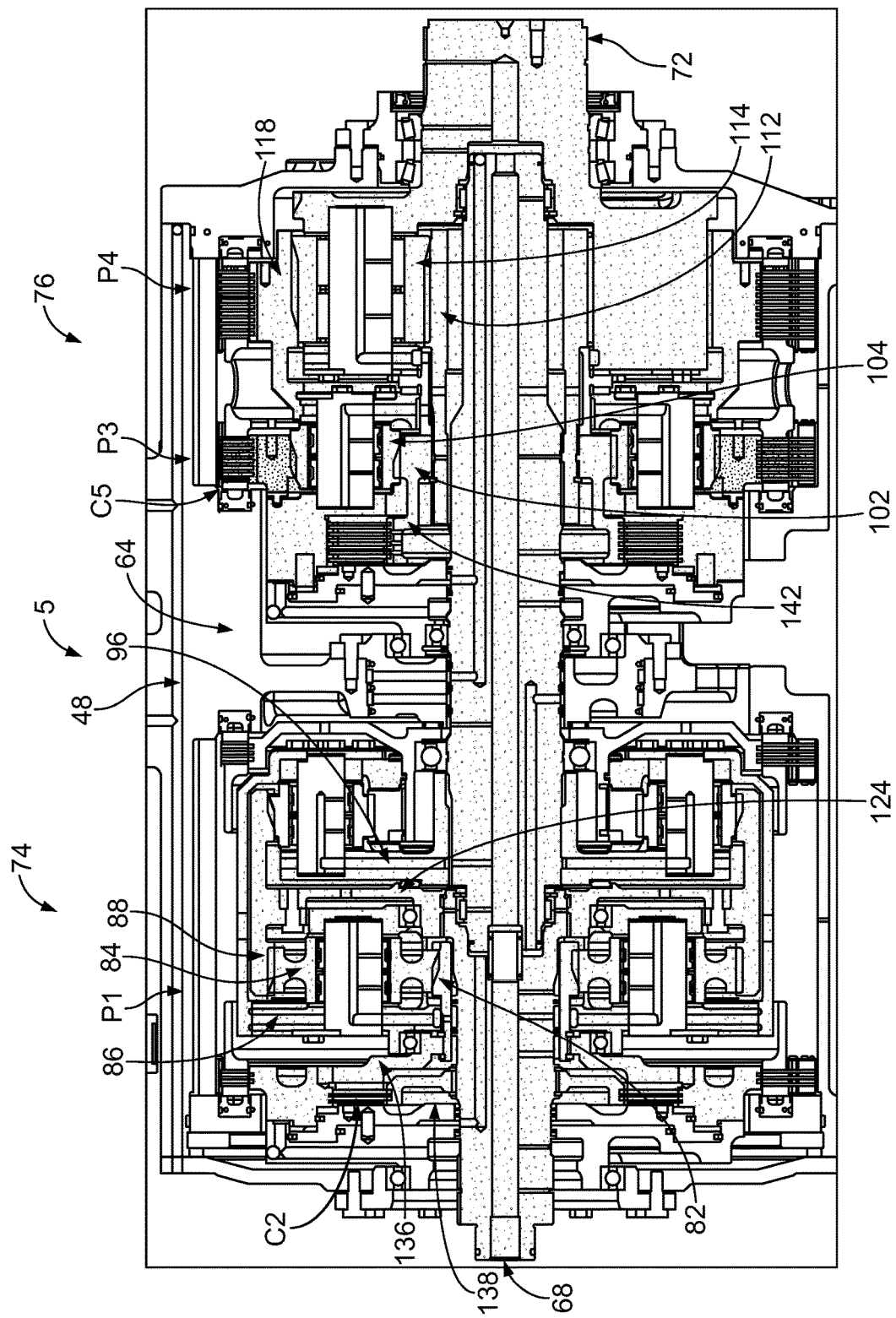
FIG. 20 is a cross-sectional view showing a $6^{th}$ range power path of the heavy-duty transmission of FIG. 2.

FIGS. 11 and 20 show the power path through transmission 5 in $6^{th}$ range, following a single pack shift event that shifts transmission 5 from $5^{th}$ range to $6^{th}$ range. In $6^{th}$ range, in the front planetary section 74, clutch C2 is again engaged to lock up the front planetary section 74 without reduction, and power flows through the front planetary section 74 along the same powerful path as when the transmission 5 is in $3^{rd}$ range as described above with respect to FIGS. 8 and 17. In the back planetary section 76, clutch C5 remains engaged, and power flows through the back planetary section 76 along the same powerful path as when the transmission 5 is in $4^{th}$ range as described above with respect to FIGS. 9 and 18.

Figure 21:
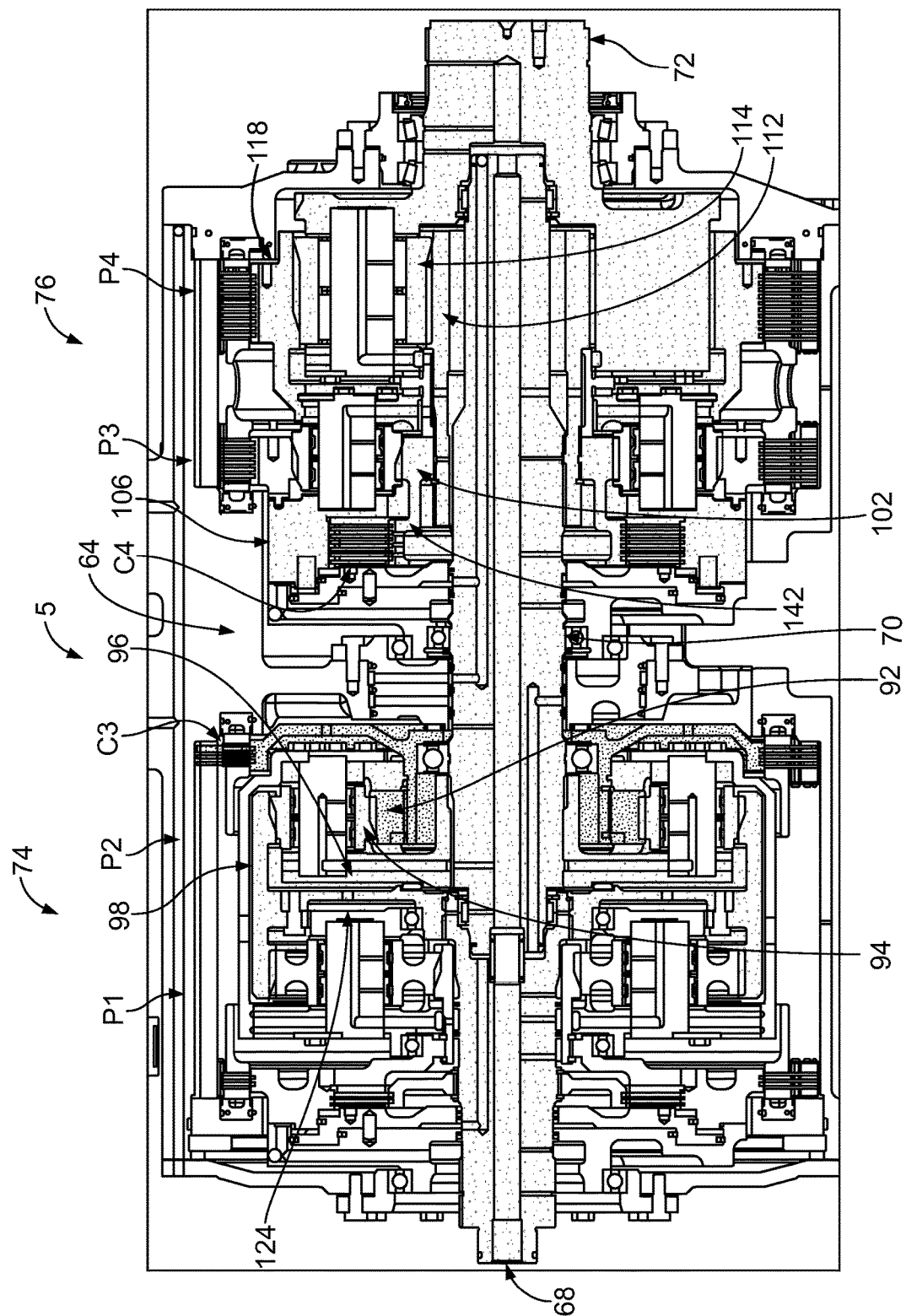
FIG. 21 is a cross-sectional view showing a $7^{th}$ range power path of the heavy-duty transmission of FIG. 2.

FIGS. 12 and 21 show the power path through transmission 5 in $7^{th}$ range, following a double pack shift as a multipack shift event that shifts transmission 5 from $6^{th}$ range to $7^{th}$ range. In $7^{th}$ range, in the front planetary section 74, clutch C3 is again engaged, and power flows through the front planetary section 74 along the same power path as when the transmission 5 is in $1^{st}$ range as described above with respect to FIGS. 6 and 15. In the back planetary section 76, clutch C4 is engaged, which locks carrier 106 of planetary gearset P3 to rotate in unison with center shaft 70. This locks up the back planetary section 76 so all of the components of planetary gearsets P3, P4 rotate as a unit, with the planet gears 104, 114 not rotating about their own axes. Power flows from center shaft 70 through carrier 106 and sun gear 112 and ring gear 118 and out carrier 116 to output shaft 72 without a reduction and thus a 1:1 gear ratio at the back planetary section 76 to rotate output shaft 72 at the same speed as center shaft 70.

Figure 22:
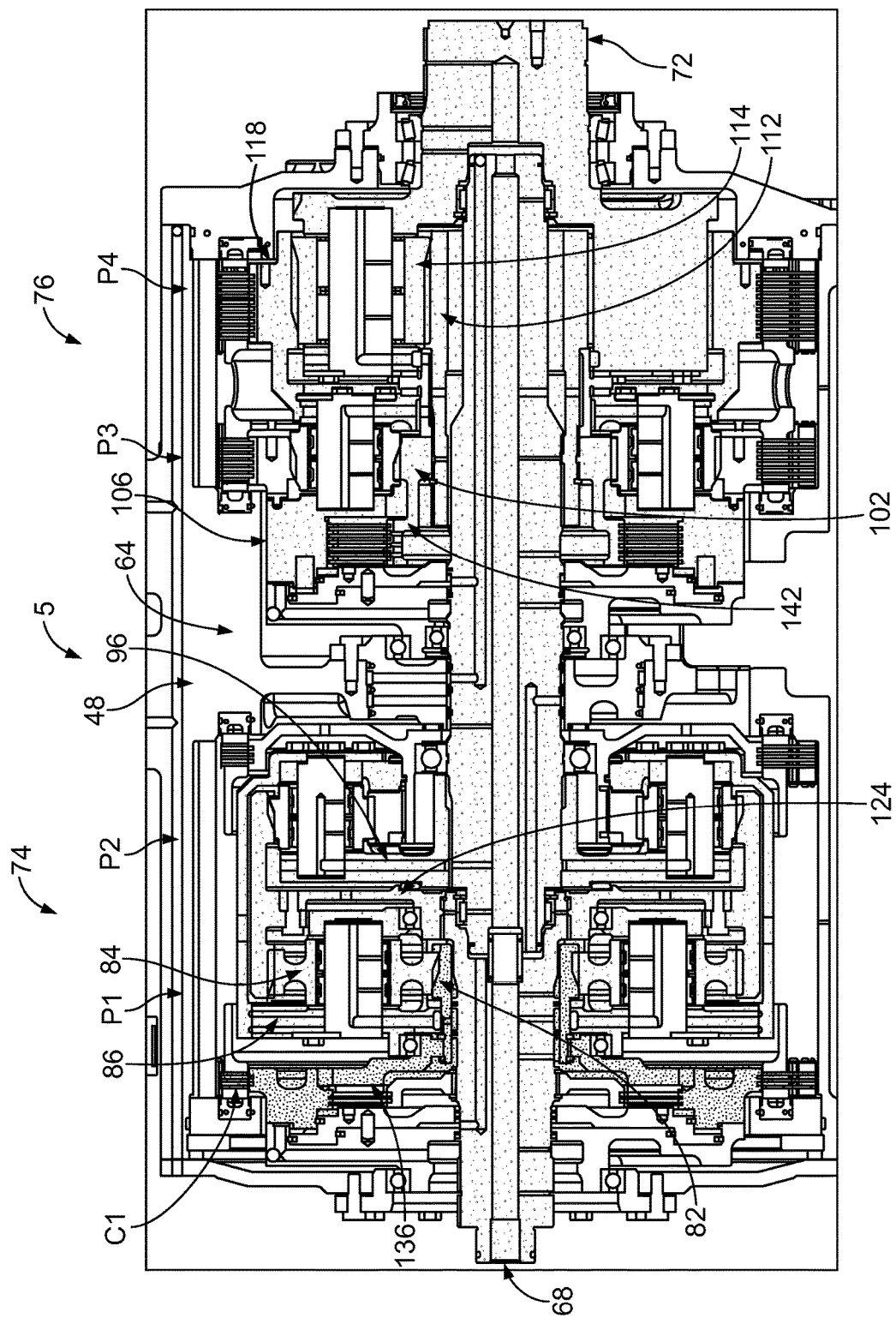
FIG. 22 is a cross-sectional view showing an $8^{th}$ range power path of the heavy-duty transmission of FIG. 2.
Figure 23:
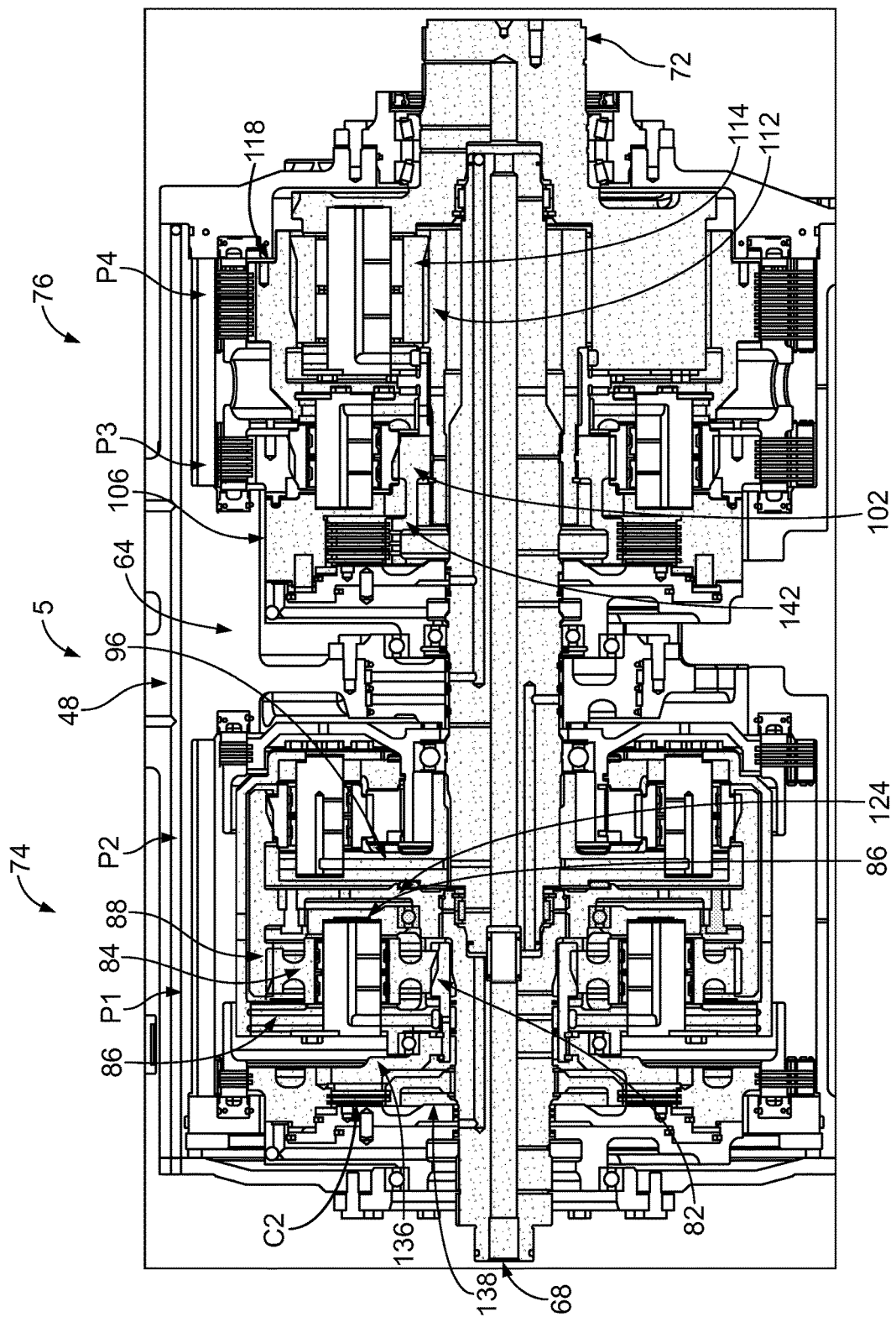
FIG. 23 is a cross-sectional view showing a $9^{th}$ range power path of the heavy-duty transmission of FIG. 2.

FIGS. 13 and 22 show the power path through transmission 5 in $8^{th}$ range, following a single pack shift event that shifts transmission 5 from $7^{th}$ range to $8^{th}$ range. In $8^{th}$ range, in the front planetary section 74, clutch C1 is again engaged and, power flows through the front planetary section 74 along the same power path as when the transmission 5 is in $2^{nd}$ range as described above with respect to FIGS. 7 and 16. In the back planetary section 76, clutch C4 remains engaged to lock up the back planetary section 76 without reduction, and power flows through the back planetary section 76 along the same power path as when the transmission 5 is in $7^{th}$ range as described above with respect to FIGS. 12 and 21.

Figure 14:
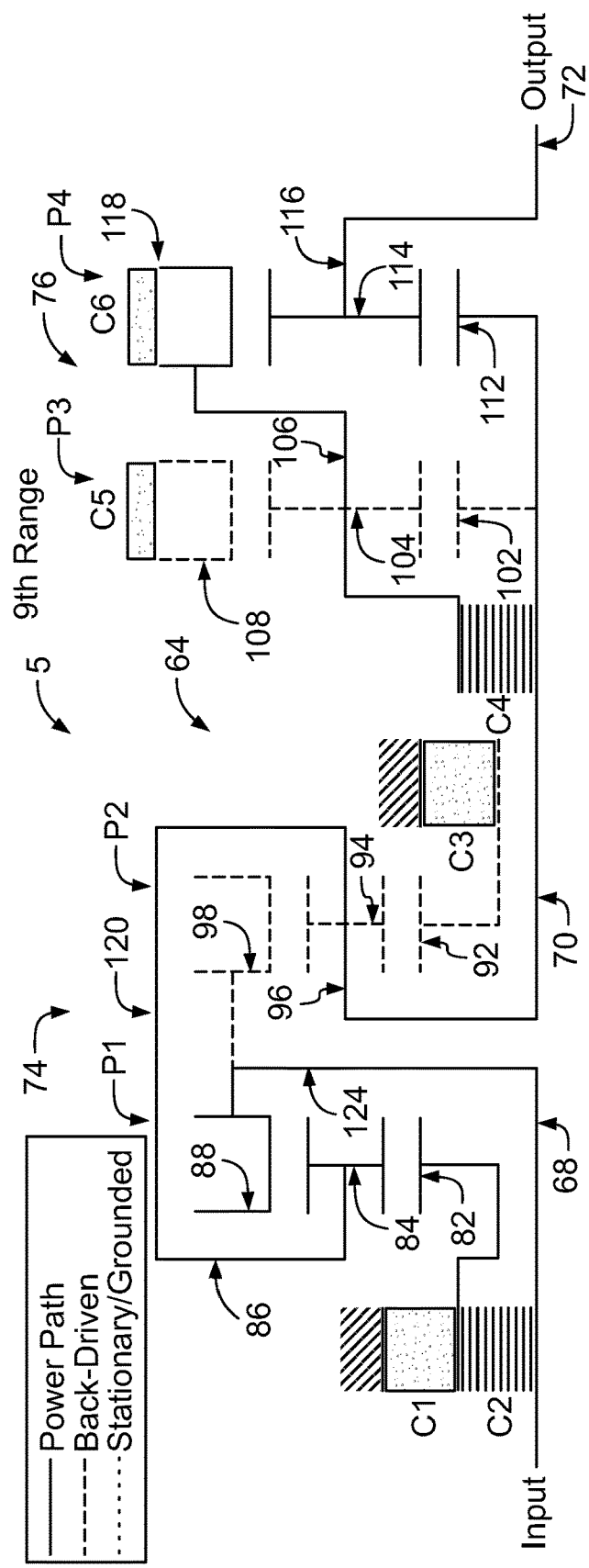
FIG. 14 is a simplified schematic view showing a $9^{th}$ range power path of the heavy-duty transmission of FIG. 2.

FIGS. 14 and 22 show the power path through transmission 5 in $9^{th}$ range, following a single pack shift event that shifts transmission 5 from $8^{th}$ range to 9th range. In $9^{th}$ range, in the front planetary section 74, clutch C2 is again engaged to lock up the front planetary section 74 without reduction, and power flows through the front planetary section 74 along the same power path as when the transmission 5 is in $3^{rd}$ range, as described above with respect to FIGS. 8 and 17. In the back planetary section 76, clutch C4 remains engaged to lock up the back planetary section 76 without reduction, and power flows through the back planetary section 76 along the same power path as when the transmission 5 is in $7^{th}$ range, as described above with respect to FIGS. 12 and 21. This provides the overall 1:1 gear ratio without reduction shown in Table 1 above when the transmission 5 is in $9^{th}$ range.

Figure 24:
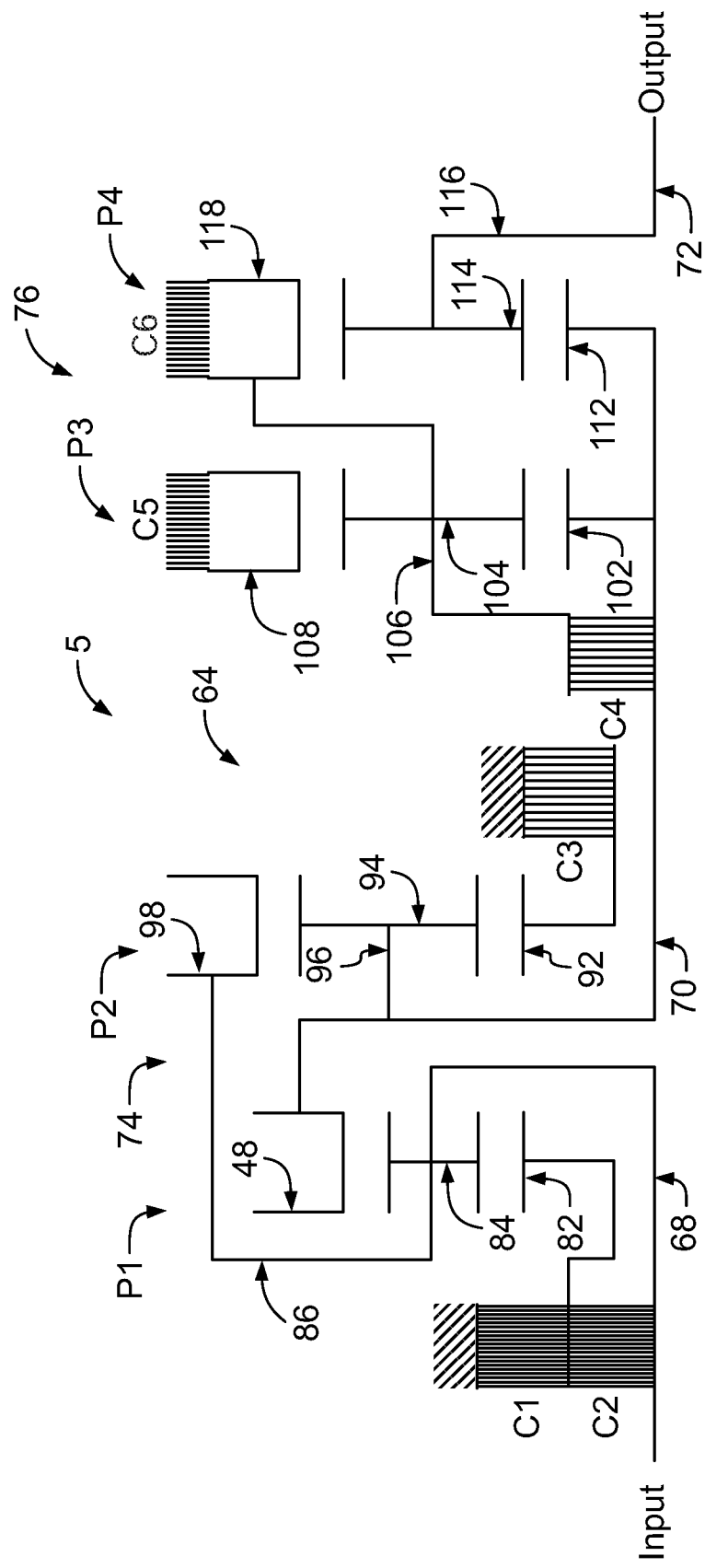
FIG. 24 is a simplified schematic view of a component layout of a variant of the heavy-duty transmission of FIG. 2.

Referring now to FIG. 24, this stick diagram schematically shows a four-stage planetary arrangement 64 that has the same back planetary section 76 as that shown in FIGS. 5-23, with a variation of the front planetary section 74 compared to that in FIGS. 5-23. In the front planetary section 74 shown in FIG. 24, the planetary carrier 86 of planetary gearset P1 is connected to ring gear 98 of planetary gearset P2. Ring gear 88 of planetary gearset P1 is connected to planet carrier 96 of planetary gearset P2. In this arrangement, the largest or deepest reduction is achieved by engaging clutch C3 to ground the sun gear 92 of planetary gearset P2. This provides a power path in which power drives from input shaft 68 into ring gear 98 of planetary gearset P2 and outputs through planet carrier 96 planetary gearset P2 and output speed that rotates center shaft 70 at a slower speed than the input speed of input shaft 68. Engaging clutch C2 locks sun gear 82 of planetary gearset P1 into rotational unison with input shaft 68, which may include locking sun gear 82 to planet carrier 86 of planetary gearset P1, to lock up the front planetary section 74. When the front planetary section 74 is locked up, all components in front planetary section 74 rotate at the same speed with the planet gears 84, 94 traveling with their carriers 86, 86, without rotating about their own axes to provide a 1:1 gear ratio with no reduction. Engaging clutch C1 grounds sun gear 82 of planetary gearset P1. This provides a power path in which power drives from input shaft 68 into planet carrier 86 of planetary gearset P1 and outputs through planetary ring gear 88 of planetary gearset P1 at a speed greater than input speed, which rotates center shaft 70 at a faster speed than the input speed of input shaft 68.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

We claim:
1. A heavy-duty transmission, comprising:
a transmission housing;
an input shaft arranged at least partially in the transmission housing receiving power into the heavy-duty transmission;
an output shaft arranged at least partially in the transmission housing delivering power out of the heavy-duty transmission;
a center shaft arranged in the transmission housing between and longitudinally aligned with the input and output shafts; and
a four-stage planetary arrangement selectively delivering power from the input shaft to the center shaft and from the center shaft to the output shaft; the four-stage planetary arrangement comprising a front planetary section with a pair of front planetary gearsets having a pair of ring gears that are selectively driven by the input shaft to receive power into the front planetary section;
wherein the pair of front planetary gearsets in the front planetary section is configured to selectively deliver power from the input shaft to the center shaft and the four-stage planetary arrangement further comprises a back planetary section with a pair of back planetary gearsets configured to selectively deliver power from the center shaft to the output shaft; and
wherein the pair of ring gears of the pair of front planetary gearsets is defined by a common ring gear having two spaced-apart internally toothed surfaces that are engaged by two sets of planetary gears of the pair of planetary gearsets.

2. The heavy-duty transmission of claim 1, wherein the common ring gear includes a pair of ring gears that provide the two spaced-apart internally toothed surfaces of the pair of front planetary gearsets and a ring gear collar that connects the pair of ring gears to each other to rotate in unison with each other.

3. The heavy-duty transmission of claim 1, wherein the pair of back planetary gearsets comprises a pair of spaced-apart axially aligned ring gears that can rotate at different speeds.

4. A heavy-duty transmission, comprising:
a transmission housing;
an input shaft arranged at least partially in the transmission housing receiving power into the heavy-duty transmission;
an output shaft arranged at least partially in the transmission housing delivering power out of the heavy-duty transmission;
a center shaft arranged in the transmission housing between and longitudinally aligned with the input and output shafts; and
a four-stage planetary arrangement selectively delivering power from the input shaft to the center shaft and from the center shaft to the output shaft; the four-stage planetary arrangement comprising a front planetary section with a pair of front planetary gearsets having a pair of ring gears that are selectively driven by the input shaft to receive power into the front planetary section;
wherein the pair of front planetary gearsets in the front planetary section is configured to selectively deliver power from the input shaft to the center shaft and the four-stage planetary arrangement further comprises a back planetary section with a pair of back planetary gearsets configured to selectively deliver power from the center shaft to the output shaft; and
wherein the pair of front planetary gearsets includes a corresponding pair of sets of planet gears and further comprises a common planet carrier assembly that carries the pair of sets of planet gears.

5. The heavy-duty transmission of claim 4, wherein the common planet carrier assembly includes a carrier adapter drum that supports the pair of sets of the planet gears.

6. The heavy-duty transmission of claim 5, wherein the pair of front planetary gearsets includes a pair of ring gears, and the carrier adapter drum that supports the pair of sets of the planet gears provides an enclosure that surrounds the pair of ring gears.

7. A heavy-duty transmission, comprising:
a transmission housing;
an input shaft arranged at least partially in the transmission housing receiving power into the heavy-duty transmission;
an output shaft arranged at least partially in the transmission housing delivering power out of the heavy-duty transmission;
a center shaft arranged in the transmission housing between and longitudinally aligned with the input and output shafts; and
a four-stage planetary arrangement selectively delivering power from the input shaft to the center shaft and from the center shaft to the output shaft, wherein the four-stage planetary arrangement further comprises:
a front planetary section with a pair of front planetary gearsets configured to selectively deliver power from the input shaft to the center shaft and a back planetary section with a pair of back planetary gearsets configured to selectively deliver power from the center shaft to the output shaft;
further comprising a front set of clutches arranged in the front planetary section and a back set of clutches arranged in the back planetary section and a transmission control system configured to control the front and back sets of clutches to select distinct power paths through the planetary gearsets;
wherein the front set of clutches includes a first clutch that extends between a first sun gear of the pair of front planetary gearsets and the transmission housing to selectively prevent or allow rotation of the first sun gear of the pair of front planetary gearsets relative to the transmission housing
wherein the front set of clutches includes a second clutch that extends between the first sun gear of the pair of front planetary gearsets and the input shaft to selectively lock the first sun gear of the pair of front planetary gearsets into rotational unison with the input shaft.

8. The heavy-duty transmission of claim 7, wherein the front set of clutches includes a first clutch that extends between a second sun gear of the pair of front planetary gearsets and the transmission housing to selectively prevent or allow rotation of the second sun gear relative to the transmission housing.

9. A heavy-duty transmission, comprising:
a transmission housing;
an input shaft arranged at least partially in the transmission housing receiving power into the heavy-duty transmission;
an output shaft arranged at least partially in the transmission housing delivering power out of the heavy-duty transmission;
a center shaft arranged in the transmission housing between and longitudinally aligned with the input and output shafts; and
a four-stage planetary arrangement selectively delivering power from the input shaft to the center shaft and from the center shaft to the output shaft; the four-stage planetary arrangement comprising a front planetary section with a pair of front planetary gearsets having a pair of ring gears that are selectively driven by the input shaft to receive power into the front planetary section;
wherein the pair of front planetary gearsets in the front planetary section is configured to selectively deliver power from the input shaft to the center shaft and the four-stage planetary arrangement further comprises a back planetary section with a pair of back planetary gearsets configured to selectively deliver power from the center shaft to the output shaft;
a front set of clutches arranged in the front planetary section;
a back set of clutches arranged in the back planetary section and a transmission control system configured to control the front and back sets of clutches to select distinct power paths through the planetary gearsets; and
wherein the back set of clutches includes a first clutch that extends between a first planet carrier of the pair of back planetary gearsets and the center shaft to selectively lock the first planet carrier of the pair of back planetary gearsets into rotational unison with the center shaft.

10. The heavy-duty transmission of claim 9, wherein the back set of clutches includes a second clutch that extends between a first ring gear of the pair of back planetary gearsets and the transmission housing to selectively prevent or allow rotation of the first ring gear of the pair of back planetary gearsets relative to the transmission housing.

11. A heavy-duty transmission, comprising:
a transmission housing;
an input shaft arranged at least partially in the transmission housing receiving power into the heavy-duty transmission;
an output shaft arranged at least partially in the transmission housing delivering power out of the heavy-duty transmission;
a center shaft arranged in the transmission housing between and longitudinally aligned with the input and output shafts;
a four-stage planetary arrangement selectively delivering power from the input shaft to the center shaft and from the center shaft to the output shaft; wherein the four-stage planetary arrangement further comprises:
a front planetary section with a pair of front planetary gearsets configured to selectively deliver power from the input shaft to the center shaft and a back planetary section with a pair of back planetary gearsets configured to selectively deliver power from the center shaft to the output shaft;
a front set of clutches arranged in the front planetary section and a back set of clutches arranged in the back planetary section and a transmission control system configured to control the front and back sets of clutches to select distinct power paths through the planetary gearsets;
wherein the back set of clutches includes a first clutch that extends between a first planet carrier of the pair of back planetary gearsets and the center shaft to selectively lock the first planet carrier of the pair of back planetary gearsets into rotational unison with the center shaft;
wherein the back set of clutches includes a second clutch that extends between a first ring gear of the pair of back planetary gearsets and the transmission housing to selectively prevent or allow rotation of the first ring gear of the pair of back planetary gearsets relative to the transmission housing; and
wherein the back set of clutches includes a third clutch that extends between a second ring gear of the pair of back planetary gearsets and the transmission housing to selectively prevent or allow rotation of the second ring gear of the pair of back planetary gearsets relative to the transmission housing.

12. A heavy-duty transmission that can shift between multiple ranges during shift events, comprising:
a transmission housing;
an input shaft arranged at least partially in the transmission housing receiving power into the heavy-duty transmission;
an output shaft arranged at least partially in the transmission housing delivering power out of the heavy-duty transmission;
a four-stage planetary arrangement selectively delivering power from the input to the output shaft, the four-stage planetary arrangement comprising:
a front planetary section with a pair of front planetary gearsets that are configured to selectively receive power from the input shaft;
a front set of clutches arranged in the front planetary section and configured to establish multiple power paths through the pair of front planetary gearsets;
a back planetary section with a pair of back planetary gearsets that are configured to selectively deliver power to the output shaft;
a back set of clutches arranged in the back planetary section and configured to establish multiple power paths through the pair of back planetary gearsets; and
a transmission control system operably connected to the front and back sets of clutches to select ones of the multiple power paths through the pairs of front and back gearsets by correspondingly engaging or disengaging ones of the clutches of the front and back sets of clutches during shift events to change ranges of the transmission,
wherein a total number of shift events corresponds to a number of range changes that can be achieved between the multiple ranges of the transmission and the four-stage planetary arrangement is configured so that more than one-half of the total number of shift events to change the ranges of the transmission are achieved by single pack shift events in a single one of the front and back planetary sections of the transmission during which a single previously engaged one of the clutches of the front or back sets of clutches in the front or back planetary section is disengaged and a single previously disengaged one of the clutches of the front or back sets of clutches of the respective front or back planetary section is engaged a center shaft arranged in the transmission housing between and longitudinally aligned with the input and output shafts, wherein the four-stage planetary arrangement is configured to rotate the output shaft in a single direction and wherein the front planetary section is configured to selectively deliver power from the input shaft to the center shaft and the back planetary section is configured to selectively deliver power from the center shaft to the output shaft;

wherein the pair of front planetary gearsets further comprises:

a common ring gear having two spaced-apart internally toothed surfaces that are engaged by two sets of planetary gears of the pair of planetary gearsets; and a common planet carrier assembly that carries the two sets of planet gears.

13. The heavy-duty transmission of claim 12, wherein the common planet carrier assembly includes a carrier adapter drum that supports the two sets of planet gears and provides an enclosure that surrounds the common ring gear.

* * * * *